United States Patent
Guha et al.

[11] Patent Number: 6,092,072
[45] Date of Patent: Jul. 18, 2000

[54] PROGRAMMED MEDIUM FOR CLUSTERING LARGE DATABASES

[75] Inventors: Sudipto Guha, Stanford, Calif.; Rajeev Rastogi, New Providence; Kyuseok Shim, Bedminster, both of N.J.

[73] Assignee: Lucent Technologies, Inc., Holmdel, N.J.

[21] Appl. No.: 09/055,941

[22] Filed: Apr. 7, 1998

[51] Int. Cl.[7] .................................................. G06F 17/30
[52] U.S. Cl. ........................................... 707/101; 707/100
[58] Field of Search .................................. 707/101, 102, 707/100, 2, 3, 5, 6; 706/25

[56] References Cited

U.S. PATENT DOCUMENTS

| | | | |
|---|---|---|---|
| 4,945,549 | 7/1990 | Simon et al. | 375/53 |
| 5,040,133 | 8/1991 | Feintuch et al. | 364/581 |
| 5,263,120 | 11/1993 | Bickel | 395/11 |
| 5,325,466 | 6/1994 | Kornacker | 706/61 |
| 5,452,371 | 9/1995 | Bozinovic et al. | 382/187 |
| 5,555,196 | 9/1996 | Asano | 364/555 |
| 5,675,791 | 10/1997 | Bhide et al. | 707/205 |
| 5,696,877 | 12/1997 | Iso | 395/241 |
| 5,706,503 | 1/1998 | Poppen et al. | 707/100 |
| 5,710,915 | 1/1998 | McElhiney | 707/3 |
| 5,784,283 | 6/1998 | Pingali et al. | 348/169 |
| 5,796,924 | 8/1998 | Errico et al. | 706/25 |
| 5,832,182 | 11/1998 | Zhang et al. | 706/50 |
| 5,940,832 | 8/1999 | Hamada et al. | 707/100 |
| 5,983,224 | 8/1998 | Singh et al. | 707/6 |
| 6,012,058 | 1/2000 | Fayyad et al. | 707/6 |

OTHER PUBLICATIONS

Tian Zhang, et al. Birch: An Efficient Data Clustering Method For Very Large Databases. In Proceedings of the ACM SIGMOD Conference on Management of Data, pp. 103–114, Montreal, Canada, Jun. 1996.

Eui–Hong Han, et al. Clustering Based On Association Rule Hypergraphs. Technical report, 1997 SIGMOD Workshop on Research Issues on Data Mining and Knowledge Discovery, Jun. 1997.

Martin Ester, et al. A Database Interface For Clustering In Large Spatial Databases. In International Conference on Knowledge Discovery in Databases and Data Mining (KDD–95), Montreal, Canada, Aug. 1995.

Raymond T. Ng, et al. Efficient And Effective Clustering Methods For Spatial Data Mining. In Proc. of the VLDB Conference, Santiago, Chile, Sep. 1994.

Jeffrey Scott Vitter. Random Sampling With A Reservoir. ACM Transactions on Mathematical Software, 11(1):37–57, 1985.

Martin Ester, et al. A Density–Based Algorithm For Discovering Clusters In Large Spatial Database With Noise. In International Conference on Knowledge Discovery in Databases and Data Mining (KDD–96), Montreal, Canada, Aug. 1996.

*Primary Examiner*—Hosain T. Alam
*Assistant Examiner*—Ella Colbert
*Attorney, Agent, or Firm*—Dickstein Shapiro Morin & Oshinsky, LLP

[57] ABSTRACT

The present invention relates to a computer method, apparatus and programmed medium for clustering large databases. The present invention represents each cluster to be merged by a constant number of well scattered points that capture the shape and extent of the cluster. The chosen scattered points are shrunk towards the mean of the cluster by a shrinking fraction to form a representative set of data points that efficiently represent the cluster. The clusters with the closest pair of representative points are merged to form a new cluster. The use of an efficient representation of the clusters allows the present invention to obtain improved clustering while efficiently eliminating outliers.

76 Claims, 10 Drawing Sheets

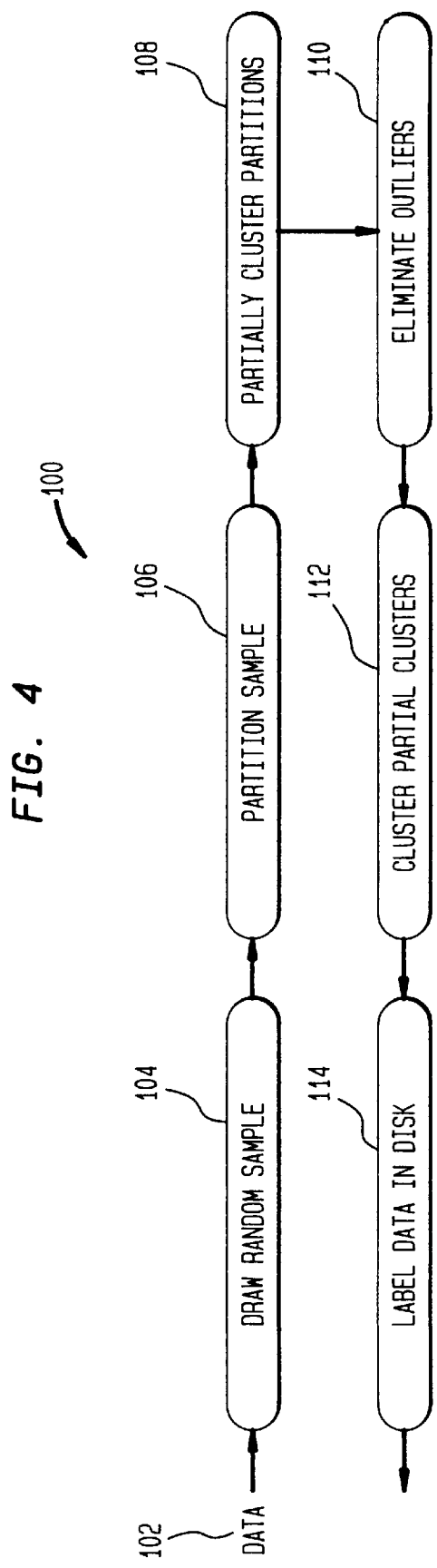

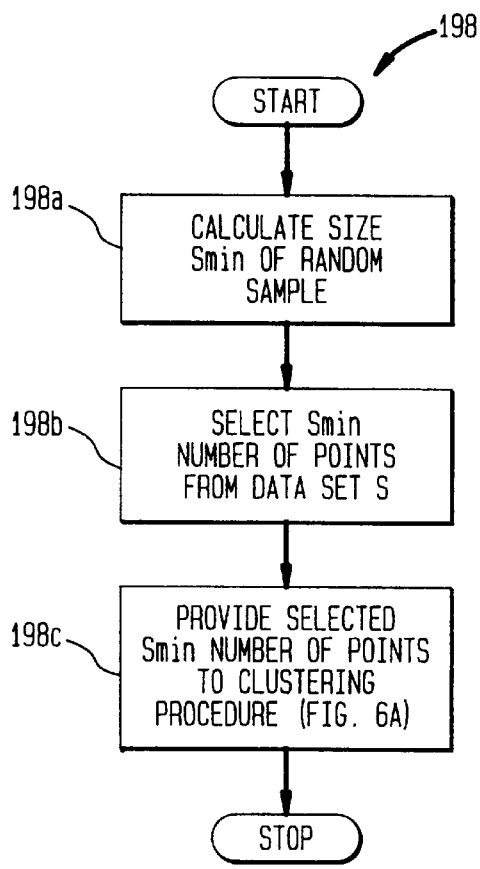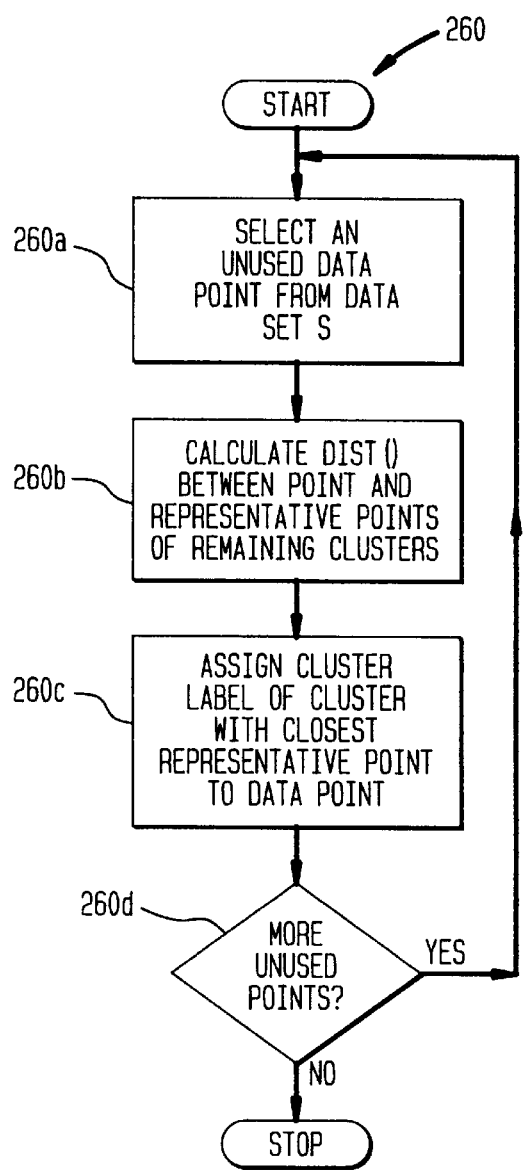

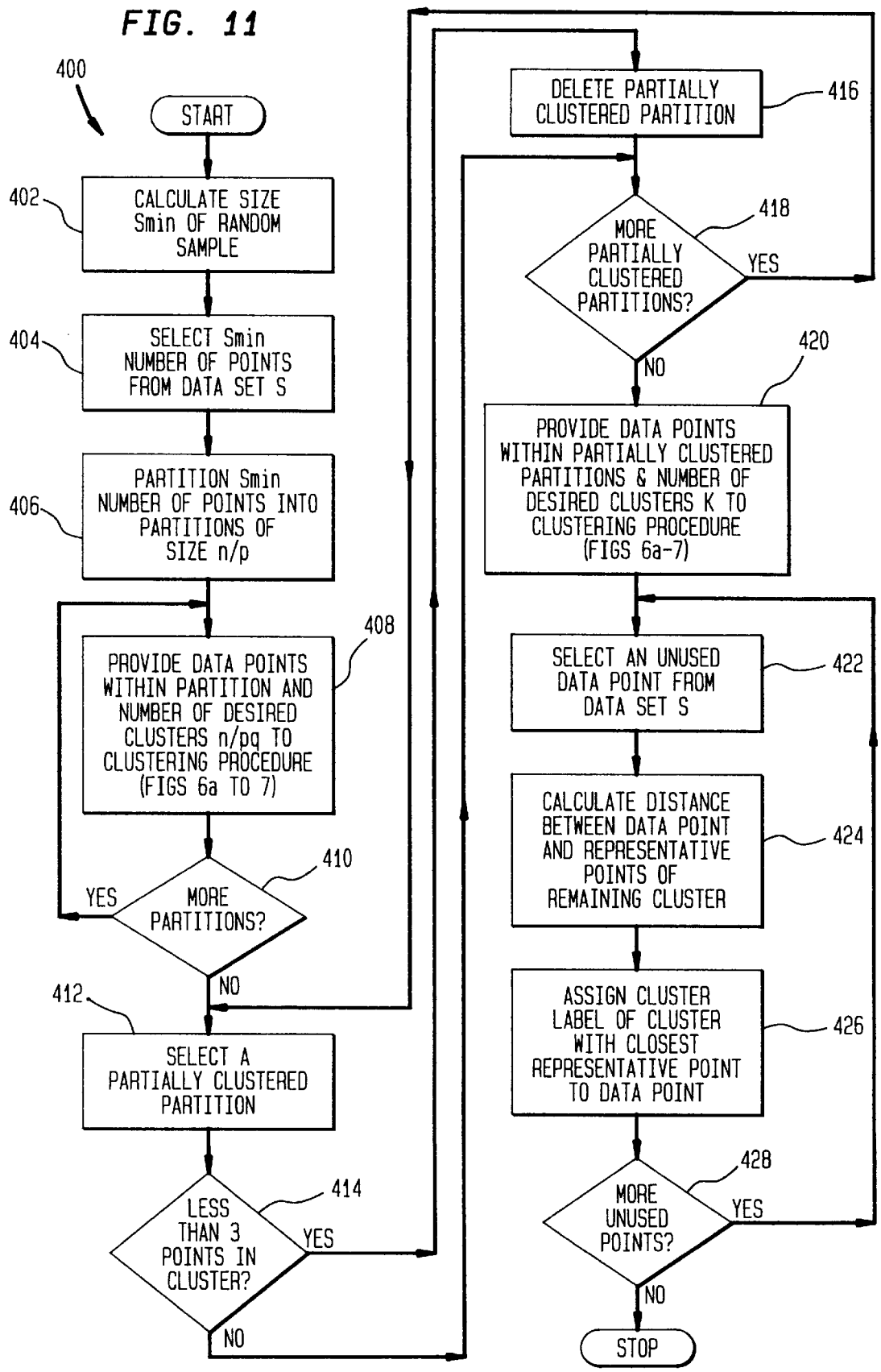

PROGRAMMED MEDIUM FOR CLUSTERING LARGE DATABASES

FIELD OF THE INVENTION

This invention relates to the art of data mining, and in particular to a system for and a method of clustering large databases by representing each cluster by a certain fixed number of points that are generated by selecting well scattered points from the cluster and then shrinking them toward the center of the cluster by a specified fraction.

BACKGROUND OF THE INVENTION

The wealth of information embedded in huge databases belonging to corporations (e.g., retail, financial, telecom) has spurred a tremendous interest in the areas of knowledge discovery and data mining. Clustering, in data mining, is a useful technique for discovering interesting data distributions and patterns in the underlying data. The problem of clustering can be defined as follows: given n data points in a d-dimensional metric space, partition the data points into k clusters such that the data points within a cluster are more similar to each other than to data points in different clusters.

Existing clustering methods can be broadly classified into partitional and hierarchical methods. Partitional clustering attempts to determine k partitions that optimize a certain criterion function. The square-error criterion is the most commonly used.

The square-error criterion is a good measure of the within-cluster variation across all the partitions. The objective is to find k partitions that minimize the square-error. Thus, square-error clustering tries to make the k clusters as compact and separated as possible, and works well when clusters are compact clouds that are rather well separated from one another. However, when there are large differences in the sizes or geometries of different clusters, as illustrated in FIGS. 1a, the square-error method could split large clusters to minimize the square-error (see FIG. 1b). The shading illustrated in FIGS. 1a and 1b indicate the clustering of the data contained within the spheres. Accordingly, in FIG. 1a, each sphere contains only one shading (the appropriate clustering) while in FIG. 1b, the larger sphere has three separate shadings representing three separate clusters for the data points within the sphere.

Hierarchical clustering is a sequence of partitions in which each partition is nested into the next partition in the sequence. An agglomerative method for hierarchical clustering starts with the disjoint set of clusters, which places each input data point in an individual cluster. Pairs of clusters are then successively merged until the number of clusters reduces to k. At each step, the pair of clusters merged are the ones between which the distance is the minimum. There are several measures used to determine distances between clusters.

For example, pairs of clusters whose centroids or means are the closest are merged in a method using the mean as the distance measure ($d_{mean}$). This method is referred to as the centroid approach. In a method utilizing the minimum distance as the distance measure, the pair of clusters that are merged are the ones containing the closest pair of points ($d_{min}$). This method is referred to as the all-points approach.

The above distance measures have a minimum variance and usually yield the same results if the clusters are compact and well-separated. However, if the clusters are close to one another or close to the same set of outliers (an outlier is a noise impulse which is locally inconsistent with the rest of the data), or if their shapes and sizes are not hyperspherical and uniform, the results of clustering can vary quite dramatically. For example, with the data set shown in FIG. 1a, using the aforementioned centroid approach ($d_{mean}$), the distance measure results in clusters that are similar to those obtained by the square-error method shown in FIG. 1b. As stated earlier, the shading illustrated in FIGS. 1a and 1b indicate the clustering of the data contained within the spheres. Accordingly, in FIG. 1a, each sphere contains only one shading (the appropriate clustering) while in FIG. 1b, the larger sphere has three separate shadings representing three separate clusters for the data points within the sphere.

As another example, consider the desired elongated clusters illustrated in FIG. 2a. The shading illustrated in FIGS. 2a to 2c indicate the clustering of the data contained within the elongated ovals. FIG. 2a illustrates each oval as containing only one shading (the appropriate clustering) representing 6 separate oval shaped clusters. The small dark region connecting the first two ovals represents outliers that do not belong to any of the 6 separate oval shaped clusters.

Using $d_{mean}$ as the distance measure, however, causes the elongated clusters to be split and portions belonging to neighboring elongated clusters to be merged. The resulting clusters are as shown in FIG. 2b. In FIG. 2b, as indicated by the shading of the ovals, the data within each oval has been split into at least two clusters. The region of outliers has also been associated with a portion of the first and second ovals.

On the other hand, with $d_{min}$ as the distance measure, the resulting clusters are as shown in FIG. 2c. As indicated by the shading, the points of the two elongated ovals connected by the narrow string of outlier points were merged into a single cluster. This cluster includes the outlier points as well. This "chaining effect" is a drawback of using $d_{min}$, that is, a few points located such that they form a bridge between two clusters causes points across the clusters to be grouped into a single elongated cluster.

From the above discussion, it follows that neither the centroid-based approach (that uses $d_{mean}$) nor the all-points approach (based on $d_{min}$) work well for non-spherical or arbitrary shaped clusters. A shortcoming of the centroid-based approach is that it considers only one point as representative of a cluster, that is, the cluster centroid. For a large or arbitrary shaped cluster, the centroids of its subclusters can be reasonably far apart, thus causing the cluster to be split. The all-points approach, on the other hand, considers all the points within a cluster as representative of the cluster. This other extreme, has its own drawbacks, since it makes the clustering method extremely sensitive to outliers and to slight changes in the position of data points.

In addition, when the number N of input data points is large, hierarchical clustering methods break down due to their non-linear time complexity (typically, $O(N^2)$) and huge I/O costs. Time complexity is normally expressed as an order of magnitude $O(\ )$, and therefore, a time complexity of $O(N^2)$ indicates that if the size of the input N doubles then the method will take four times as many steps to complete. In order to remedy this problem, recent clustering methods initially perform a preclustering phase in which dense regions of points are represented by compact summaries, and then a centroid-based hierarchical approach is used to cluster the set of summaries (which is much smaller than the original data set).

For example, Zhang et al., in An Efficient Data Clustering Method for Very Large Databases, Proceedings of the ACM SIGMOD Conference on Management of Data, pages 103–114, Montreal, Canada, June 1996, refers to a preclustering method called BIRCH. In BIRCH, the preclustering approach to reduce input size is incremental and approximate. During preclustering, the entire database is scanned, and cluster summaries are stored in memory in a data structure called the CF-tree. For each successive data point, the CF-tree is traversed to find the closest cluster to it in the tree, and if the point is within a threshold distance of the closest cluster, it is absorbed into it. Otherwise, it starts its own cluster in the CF-tree.

Once the clusters are generated, a final labeling phase is carried out in which using the centroids of clusters as seeds, each data point is assigned to the cluster with the closest seed. Using only the centroid of a cluster when redistributing the data in the final phase has problems when clusters do not have uniform sizes and shapes (see FIGS. 3a–3b). The shading illustrated in FIGS. 3a and 3b indicate the cluster labeling of the data contained within the spheres. In FIG. 3a, each sphere contains only one shading (the appropriate cluster labeling) while in FIG. 3b, the larger sphere has two separate shadings representing two separate cluster labels for the data points within the sphere. One shading of the larger sphere matches the shading of the smaller sphere indicating that data from the larger sphere were labeled as belonging to the cluster of data points within the smaller sphere. This labeling occurred in the final labeling phase because some of the points in the larger cluster were closer to the centroid of the smaller cluster than they were to the centroid of the larger cluster (see FIG. 3b).

Another approach utilizes a partitional clustering method for large databases which is based on a randomized search. For example, Raymond T. Ng and Jiawei Han, in Efficient and Effective Clustering Methods for Spatial Data Mining, Proceedings of the VLDB Conference, Santiago, Chile, September 1994, refers to a clustering method called CLARANS. In CLARANS, each cluster is represented by its medoid, the most centrally located point in the cluster, and the objective is to find the k best medoids that optimize the criterion function. The approach reduces this problem to that of graph search by representing each set of k medoids as a node in the graph, two nodes being adjacent if they have k-1 medoids in common. Initially, an arbitrary node is set to be the current node and a fixed number of iterations are performed. In each iteration, a random neighbor of the current node is set to be the current node if it results in better clustering. The computation of the criterion function for the random neighbor requires the entire database to be examined.

Another approach uses an R*-tree to improve the I/O efficiency of randomized searches on large databases by drawing samples from leaf pages to reduce the number of data points (since data points are packed in leaf nodes based on spatial locality, a sample point in the leaf page can be a good representative point), and focusing on relevant points when evaluating the "goodness" of a neighbor.

These methods work well for convex or spherical clusters of uniform size. However, they are unsuitable when clusters have different sizes (see FIGS. 1a–1b), or when clusters are non-spherical (see FIGS. 2a–2c).

Density-based methods have been used in an attempt to cluster arbitrary shaped collections of points (e.g., ellipsoid, spiral, cylindrical). The density-based method requires the user to specify two parameters that are used to define minimum density for clustering—the radius Eps of the neighborhood of a point and the minimum number of points MinPts in the neighborhood. Clusters are then found by starting from an arbitrary point and if its neighborhood satisfies the minimum density, including the points in its neighborhood into the cluster. The process is then repeated for the newly added points.

While a density-based method can find clusters with arbitrary shapes, it suffers from a number of problems. For example, a density-based method is very sensitive to the parameters Eps and MinPts, which in turn, are difficult to determine. Furthermore, the method also suffers from the robustness problems that plague the all-points hierarchical clustering method, that is, in case there is a dense string of points connecting two clusters, the density-based method could end up merging the two clusters. Also, the method does not perform any preclustering and executes directly on the entire database. As a result, for large databases, the density-based approach could incur substantial I/O costs. Finally, with density-based methods, using random sampling to reduce the input size may not be feasible since there could be substantial variations in the density of points within each cluster in the random sample.

Accordingly, a clustering method that can identify clusters having non-spherical shapes and a wide variety of sizes, while efficiently handling outliers, is still needed.

SUMMARY OF THE INVENTION

This invention provides a method, apparatus and programmed medium for clustering large databases capable of identifying clusters having non-spherical shapes and a wide variety of sizes while efficiently handling outliers.

The invention also provides a method, apparatus and programmed medium for clustering large databases with reduced time and space complexities.

The invention accomplishes the above and other objects and advantages by providing a hierarchical clustering method of clustering large databases by representing each cluster by a constant number c of well scattered points that capture the shape and extent of the cluster. The chosen scattered points are next shrunk towards the mean of the cluster by a fraction $\alpha$. These scattered points, after shrinking, are used as representatives of the cluster. The clusters with the closest pair of representative points are then merged to reduce the number of clusters. The remaining clusters are again shrunk and merged. This process continues until a desired number of clusters is reached.

The scattered points approach employed by the present invention alleviates the shortcomings of both the all-points and centroid-based approaches. It enables the present invention to correctly identify the clusters in FIG. 2a. The present invention is less sensitive to outliers since shrinking the scattered points toward the mean dampens the adverse effects caused by outliers; outliers are typically further away from the mean and are thus shifted a larger distance due to the shrinking.

In another embodiment of the present invention, time and space complexities are reduced by drawing a random sample of data points from the database before the clustering and merging operations described in the preceding paragraphs are executed. Random samples of moderate sizes preserve information about the geometry of clusters while reducing execution time and memory requirements, thus enabling the present invention to correctly cluster the input quickly and more efficiently.

In addition, in yet another embodiment and in order to further speed up clustering, the invention first partitions the random sample and partially clusters the data points in each partition before the clustering and merging operations. After eliminating outliers, the preclustered data in each partition is then clustered in a final pass to generate the final clusters.

Once clustering is completed, instead of a single centroid, as in the prior art methods, multiple representative points from each cluster are used to label the remainder of the data set thus eliminating the labeling problems of the prior art methods.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 4 is a block diagram illustrating the overall method of preferred embodiments of the present invention;

FIG. 9 illustrates, in flow chart form, the process of selecting a random data set in accordance with a second preferred embodiment of the present invention;

FIG. 10 illustrates, in flow chart form, the process of providing a cluster label to data; and FIG. 11 illustrates, in flow chart form, a third preferred embodiment of the present invention.

DETAILED DESCRIPTION OF THE PREFERRED EMBODIMENTS

FIG. 4 illustrates, generally, the method steps 100 involved in clustering a database according to various preferred embodiments of the present invention. For example, a first embodiment of the present invention performs method steps 112 (although in this embodiment, a clustering of all data 102 is performed), a second embodiment performs method steps 104, 112 (although in this embodiment, a clustering of the random sample of data 102 from step 104 is performed) and 114, while the third preferred embodiment performs steps 104 through 114.

For overview purposes, all of the steps shown in FIG. 4 are now briefly described. Individual elements of the FIG. 4 process will be described in greater detail below with more specificity. In step 104, the method begins by drawing a random sample of data points from the input data 102. This random sample is then partitioned in step 106 and partially clustered in step 108. After eliminating outliers in step 110, the preclustered data in each partition is then clustered in step 112. Once the clustering of the random sample is completed, multiple representative points from each cluster are used to label the remainder of the data set in step 114. The method 100 is described below in detail.

Figure 1A:
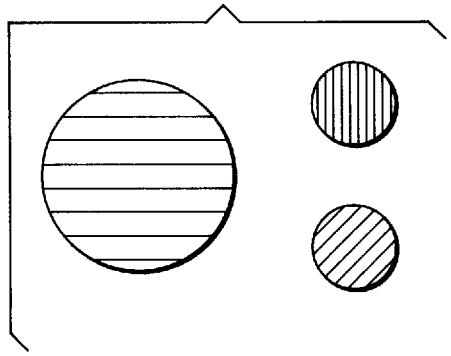
FIGS. 1a and 1b are illustrations of a target clustering of a database and the resulting clustering performed by a square-error clustering method.
Figure 1B:
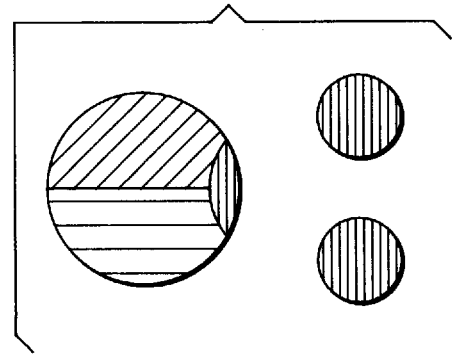
Figure 3A:
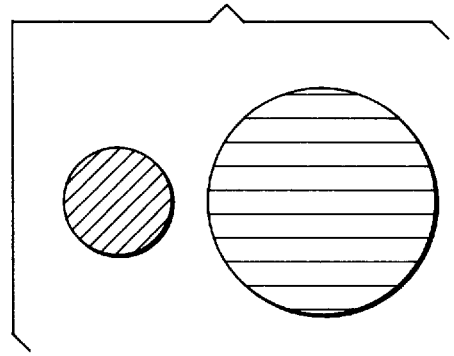
FIGS. 3a and 3b are illustrations of a target labeling of a database and the resulting labeling performed by a preclustering-based clustering method.
Figure 3B:
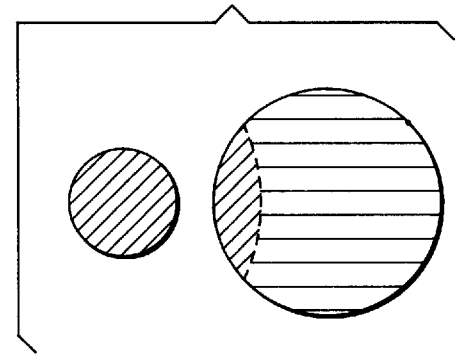
Figure 2A:
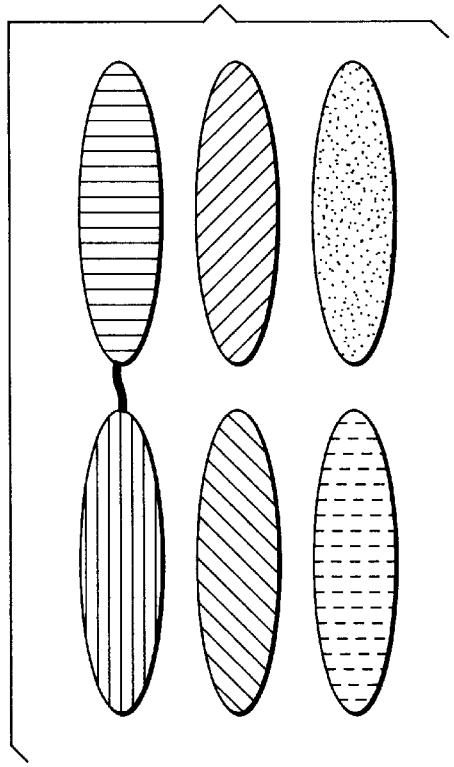
FIGS. 2a–2c are illustrations of a target clustering of a database and the resulting clustering performed by centroid-based and all-points clustering methods.
Figure 2B:
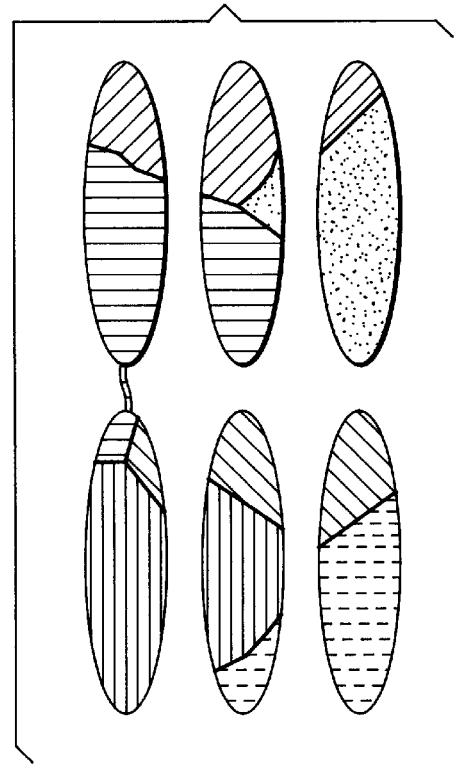
Figure 2C:
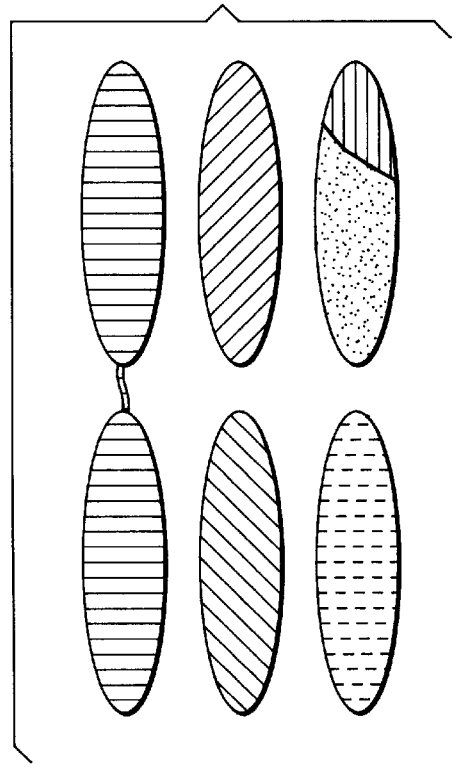
Figure 5:
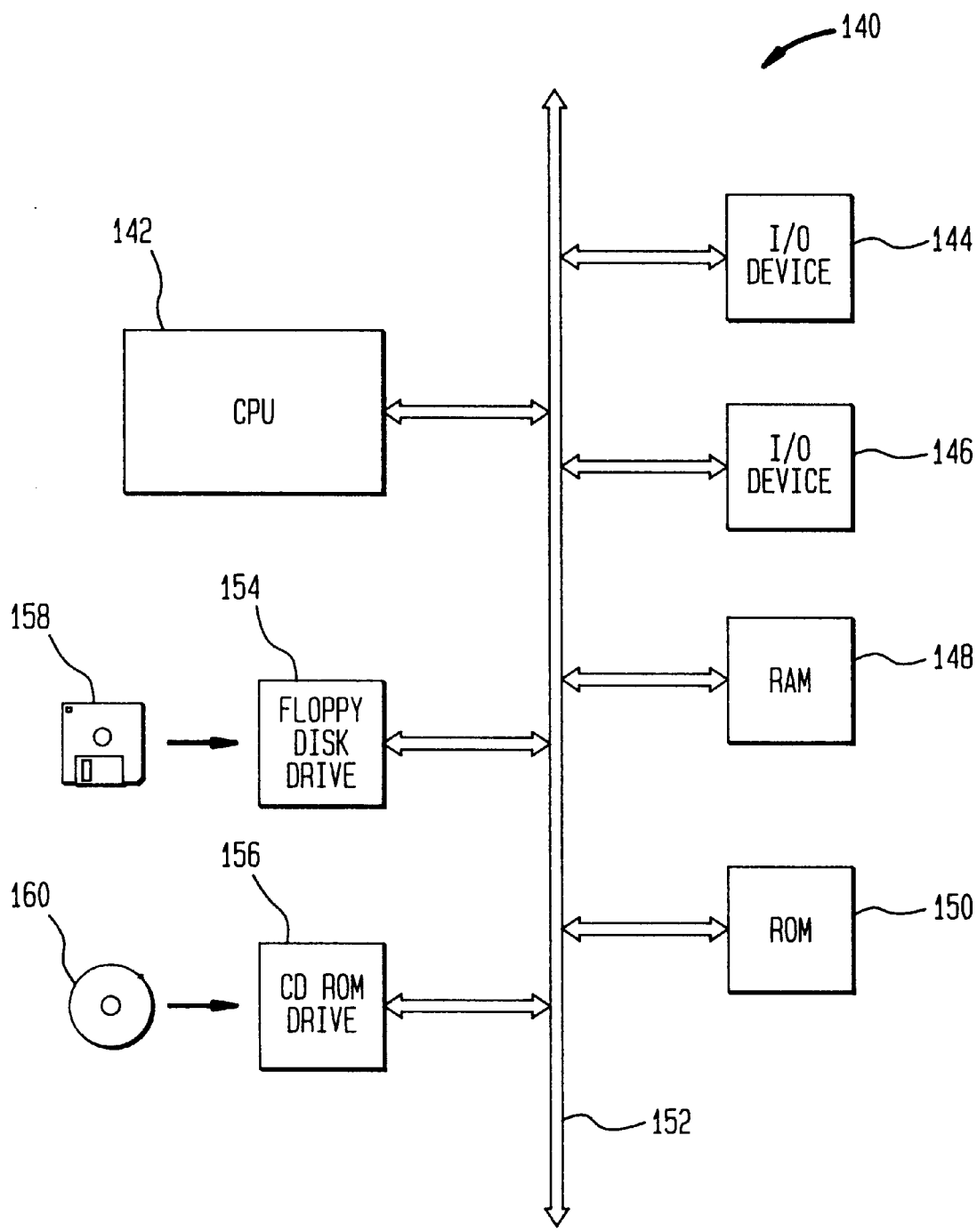
FIG. 5 illustrates a block diagram of a computer system for accomplishing the clustering methods of FIG. 4.

Referring now to FIG. 5, in a preferred embodiment, the clustering method 100 of the present invention is performed on a programmed general purpose computer system 140. The computer system 140 includes a central processing unit (CPU) 142 that communicates to an input/output (I/O) device 144 over a bus 152. A second I/O device 146 is illustrated, but is not necessary to practice the method 100 of the present invention. The computer system 140 also includes random access memory (RAM) 148, read only memory (ROM) 150, and may include peripheral devices such as a floppy disk drive 154 and a compact disk (CD) ROM drive 156 that also communicate with the CPU 142 over the bus 152. It must be noted that the exact architecture of the computer system 140 is not important and that any combination of computer compatible devices may be incorporated into the system 140 as long as the method 100 of the present invention can operate on a system 140 having a CPU 142, RAM 148 and storage memory as described below. Moreover, the program for CPU 142 which causes it to implement the invention may be stored in ROM 150, CD-ROM 156, floppy disk 158, a hard drive or any other medium capable of storing a program. During execution of the program it will be loaded into RAM 148. All of these devices communicate with CPU 142 as is well known in the art.

The CPU 142 performs logical and mathematical operations required by the method 100 of the present invention, such as data manipulation and comparisons, as well as other arithmetic and logical functions generally understood by those of ordinary skill in the art. The RAM 148 is used to store the data 102 to be clustered, clustered data and program instructions required to implement the method 100 of the present invention and can be comprised of conventional random access memory (RAM), bulk storage memory, or a combination of both, as generally understood by those of ordinary skill in the art. The I/O devices 144, 146 are responsible for interfacing with an operator of the computer system 140 or with peripheral data devices such as a hard drive or other device (not shown) to receive or distribute the data 102 as generally understood by those of ordinary skill in the art.

A brief overview of the clustering method of a first embodiment of the present invention is as follows (this embodiment performs a variation of the clustering step 112 as illustrated in FIG. 4 where all of the data 102 is being clustered—there are no partial clusters in this embodiment). The method will be described in detail below. The method starts with each input point viewed as a separate cluster, and at each successive step merges the closest pair of clusters into one cluster. In order to compute the distance between a pair of clusters, for each cluster, representative points are stored. These are determined by first choosing a constant number c of well scattered points within the cluster, and then shrinking them toward the mean of the cluster by a fraction $\alpha$. The distance between two clusters is then the distance between the closest pair of representative points (with one point belonging to each of the two clusters). Thus, only the c representative points of a cluster are used to compute its distance from other clusters.

The c representative points attempt to capture the physical shape and geometry of the cluster. Furthermore, shrinking the scattered points toward the mean by a factor $\alpha$ gets rid of surface abnormalities and mitigates the effects of outliers. The reason for this is that outliers typically will be further away from the cluster center, and as a result, the shrinking would cause outliers to move more toward the center while the remaining representative points would experience minimal shifts. The larger movements in the outliers would thus reduce their ability to cause the wrong clusters to be merged.

The parameter α can also be used to control the shapes of clusters. A smaller value of α shrinks the scattered points very little and thus favors elongated clusters. On the other hand, with larger values of α, the scattered points get located closer to the mean, and clusters tend to be more compact.

Figure 6A:
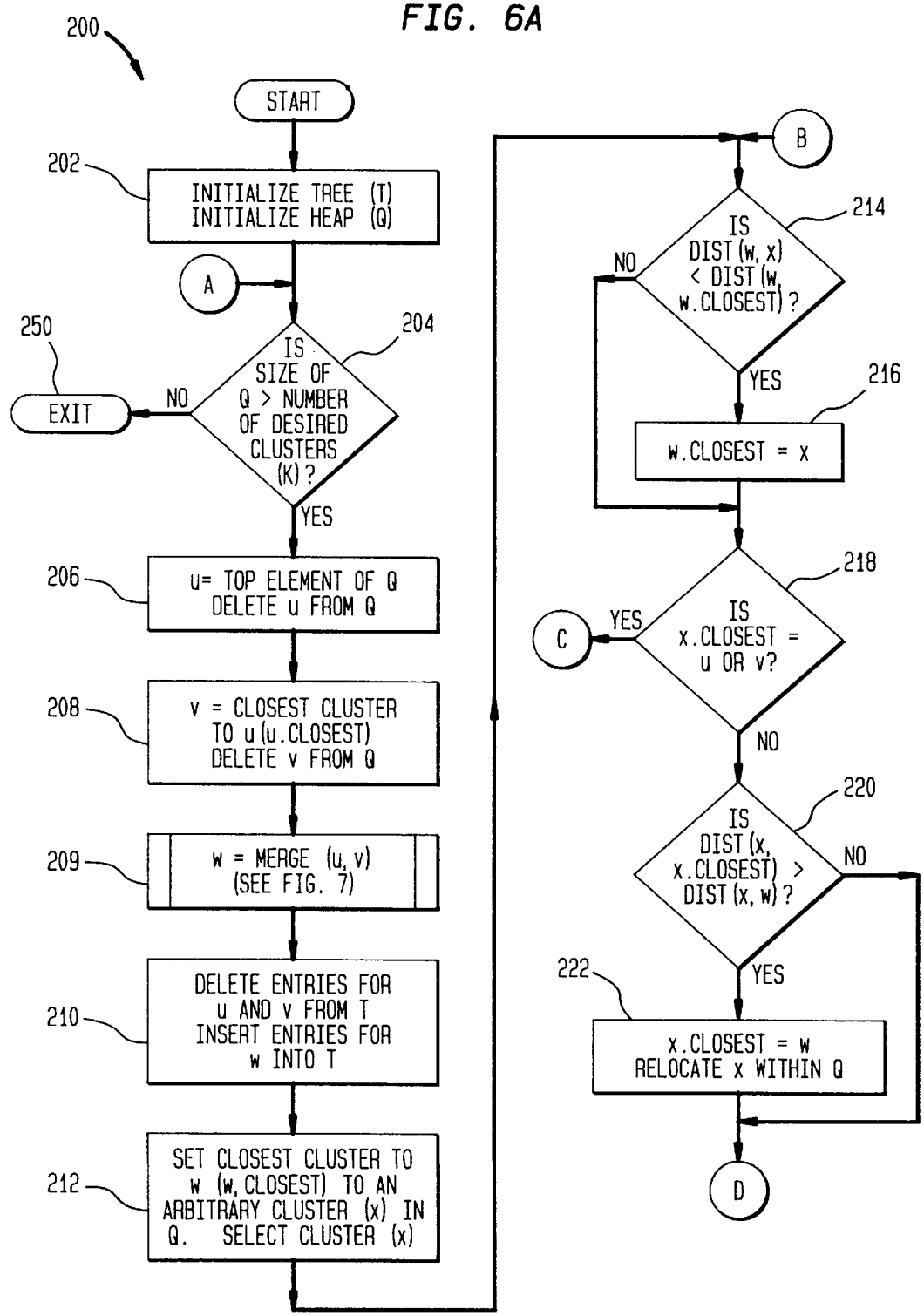
FIGS. 6a and 6b illustrate, in flow chart form, the clustering method of a first preferred embodiment of the present invention.
Figure 6B:
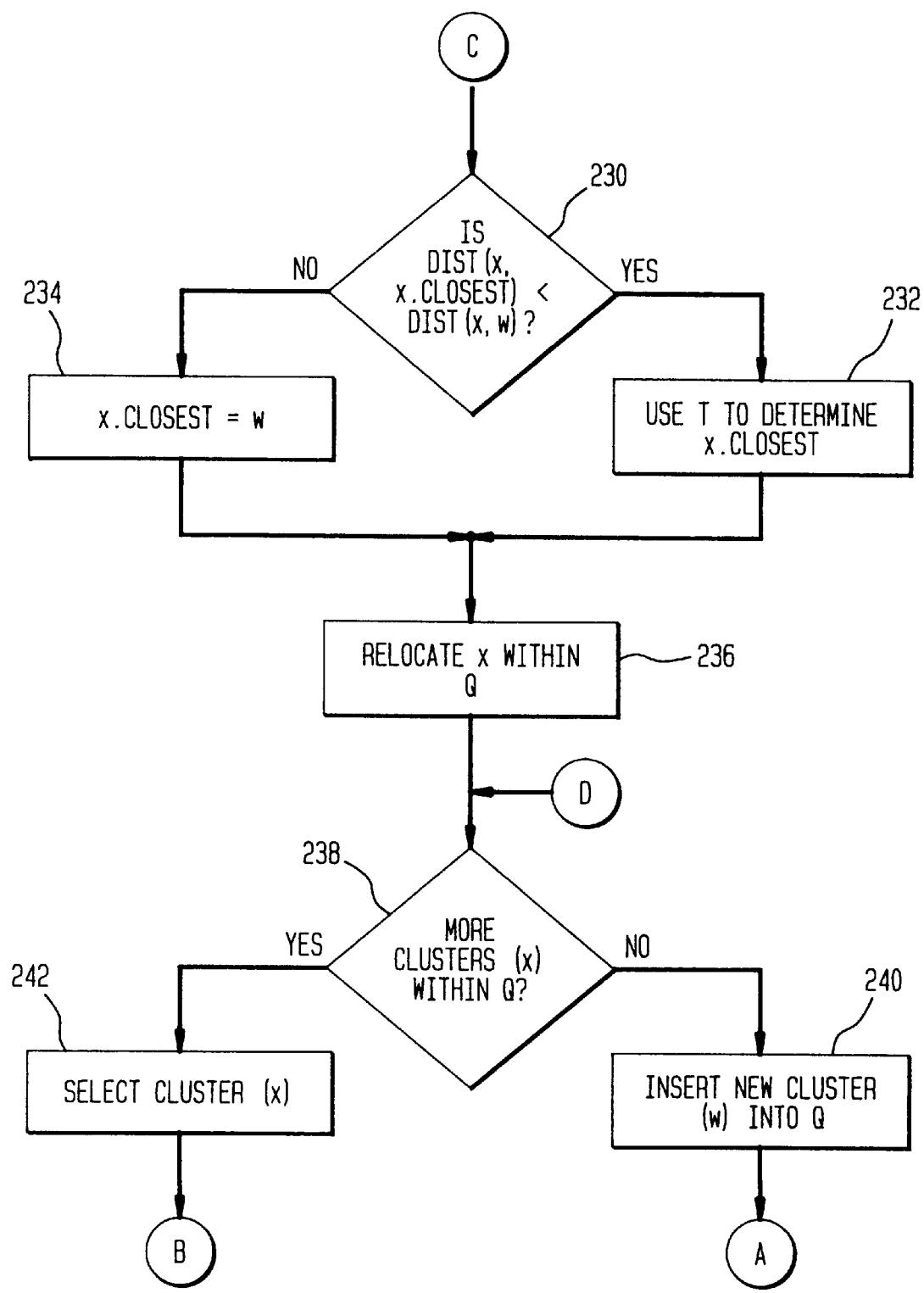

Referring now to FIGS. 6a and 6b, a detailed description of the clustering method of the first embodiment of the present invention now follows (this embodiment performs a variation of the clustering step 112 as illustrated in FIG. 4 where all of the data 102 is being clustered—there are no partial clusters in this embodiment). The input parameters of the method are the input data set S containing n data points in d-dimensional space and the desired number of clusters k. As mentioned earlier, starting with the individual points as individual clusters, at each step the closest pair of clusters is merged to form a new cluster. The process is repeated until there are only k remaining clusters.

With every cluster is stored all the points in the cluster. Also, for each cluster u, u.mean and u.rep store the mean of the points in the cluster and the set of c representative points for the cluster, respectively. For a pair of points p and q, dist (p,q) denotes the distance between the points. This distance could be any of the Lp metrics like the $L_1$ ("Manhattan") or $L_2$ ("Euclidean") metrics. Alternatively, nonmetric similarity functions can also be used. The distance between two clusters u and v can then be defined as $$dist(u, v) = \min_{p \in u.rep, q \in v.rep} dist(p, q)$$

Where p indicates points selected from the representative points u.rep of cluster u (that is, $p \in u.rep$) and q indicates points selected from the representative points v.rep of cluster v (that is, $q \in v.rep$). For every cluster u, we keep track of the cluster closest to it in u.closest.

The method of the present invention makes extensive use of two data structures, a heap and a k-d tree. Furthermore, corresponding to every cluster u, there exists a single entry in the heap; the entries for the various clusters u are arranged in the heap in the increasing order of the distances between u and u.closest.

The second data structure is a k-d tree that stores the representative points for every cluster. The k-d tree is a data structure for efficiently storing and retrieving multi-dimensional point data. It is a binary search tree with the distinction that a different key value is tested at each level of the tree to determine the branch to traverse further. For example, for two dimensional data points, the first dimension of the point is tested at even levels (assuming the root node is level 0) while the second dimension is tested at odd levels. When a pair of clusters is merged, the k-d tree is used to compute the closest cluster for clusters that may previously have had one of the merged clusters as its closest cluster. The computation is performed by conventional k-d tree methods as appreciated by those skilled in the art.

Initially, for each cluster u, the set of representative points u.rep contains only the point in the cluster because each point is being viewed as an individual cluster prior to the first pass through the main loop (steps 204 to 240) of the clustering procedure (described in detail below). Thus, in Step 202, all input data points are inserted into the k-d tree T. In addition, the heap Q is created and initialized with each input point treated as a separate cluster u. Accordingly, the u.closest is also computed for each cluster u. Each cluster u is then inserted into the heap Q. As noted, the clusters in the heap Q are arranged in the increasing order of distances between u and u.closest.

Once the heap Q and tree T are initialized, the method loops between steps 204 and 240 (FIGS. 6a and 6b) to merge the closest pair of clusters (main loop). The looping continues until only k clusters remain, at which point the method is completed (step 250).

The cluster u at the top of the heap Q is the cluster for which u and u.closest are the closest pair of clusters. Thus, at step 206, the top element u in the heap Q is extracted from and deleted from the heap Q. At step 208, the u.closest for the extracted cluster u is extracted and designated as cluster v.

At step 209, the merge procedure (described in detail below) is used to merge the closest pair of clusters u and v, and to compute new representative points for the new merged cluster w which are subsequently inserted into the tree T (in Step 210). Since the points in cluster w are comprised of the union of the points in the two clusters u and v that were merged, the points in the two clusters u and v are also deleted from the tree T in step 210.

For the merged cluster w, since the set of representative points for it could have changed (that is, because a new set of representative points is computed for it), there is a need to compute its distance to every other cluster and set w.closest to the cluster closest to it. This is performed by initially selecting an arbitrary cluster x from the heap Q as the w.closest and then looping through steps 214 to 242 (secondary loop) for each of the clusters x in the heap Q. The secondary loop also calculates the x.closest for the cluster x, and if necessary relocates x in the heap Q (depending on the distance between x and x.closest).

At step 212, an arbitrary cluster x, from the heap Q, is set as the w.closest for the new merged cluster w. Once w.closest is set, a cluster x is then selected from the heap Q to be used as follows. At step 214, if the distance between clusters x and w is less than the distance between clusters w and w.closest, then w.closest is set to cluster x in step 216. The remaining steps calculate the x.closest for the cluster x, and if necessary relocates x in the heap Q.

A brute-force method for determining the closest cluster to x is to compute its distance with every other cluster (including w). However, this would require O(n) steps for each cluster in Q, and could be computationally expensive and inefficient. Instead, it is observed that the expensive computation of determining the closest cluster is not required for every cluster x. For the few cases that it is required, the tree T is used to determine this efficiently in O(log n) steps per case, as described below (in step 232).

The clusters in the heap Q can be classified into two groups. The first group of clusters are those who had either u or v as the closest cluster before u and v were merged. This determination is made at step 218. The remaining clusters in the heap Q make up the second group.

For a cluster x in the first group, the method continues at step 230. At step 230, if the distance to w is smaller than its distance to the previously closest cluster (for example u), then all that is required is to set w to be the closest cluster (see step 234). The reason for this is that it is known that the distance between x and every other cluster is greater than the distance between x and u.

More work is required when the distance between x and w is larger than the distance between x and u because any of the other clusters could become the new closest cluster to x. At step 232, the tree T is used to determine the closest cluster to cluster x. For every point p in x.rep, the tree T is used to determine the nearest neighbor to p that is not in x.rep. From among the nearest neighbors, the one that is closest to one of x's representative points is determined and the cluster containing it is returned as the closest cluster to x. The nearest neighbor is determined by conventional k-d tree methods as appreciated by those skilled in the art.

Processing a cluster x in the second group is much simpler since x.closest already stores the closest cluster to x from among existing clusters (except w). Thus, at step 220, if the distance between x and w is smaller than x's distance to its previously closest cluster, x.closest, then w becomes the closest cluster to x in step 234; otherwise, nothing needs to be done, When the x.closest for a cluster x is updated, there is the possibility that the distance between x and its closest cluster may have changed, therefore, x may also need to be relocated in the heap Q in step 222.

Once x.closest is determined, either in step 232 or 234, the cluster x is relocated within the heap Q in step 236. Step 238 determines if there are more clusters x within the heap Q. If there are more clusters x, a new cluster x is selected from the heap (step 242) and the loop continues back at step 214. If there are no more clusters x within the heap Q, the new merged cluster w (and its w.closest) are inserted into the heap Q (step 240) and the method continues back at step 204.

Figure 7:
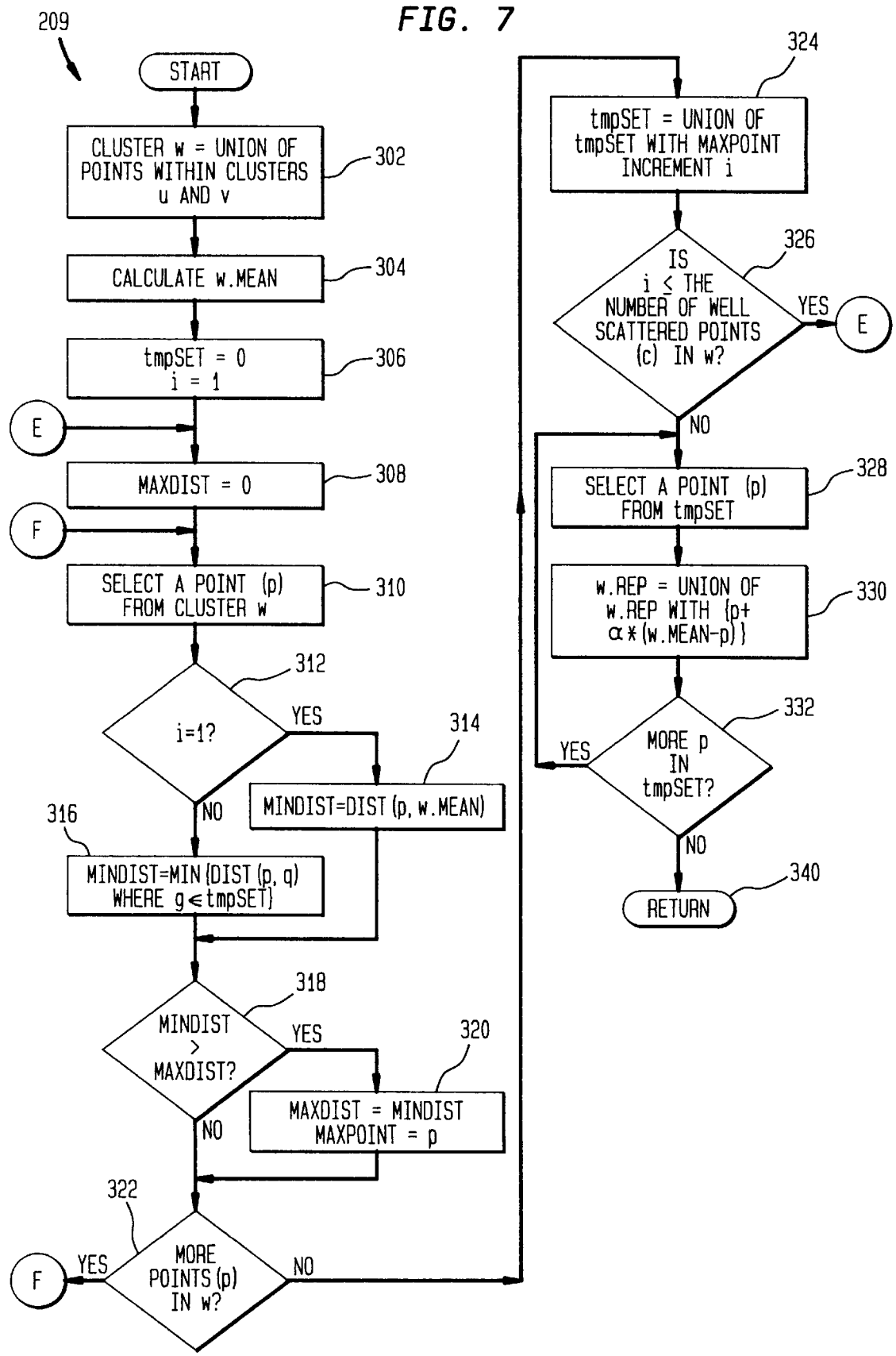
FIG. 7 illustrates, in flow chart form, the cluster merging method of a portion of the preferred embodiment of the present invention.

Referring to FIG. 7, the operation of the merge procedure (of step 209) is described as follows. Briefly, the merge procedure, initially selects c well-scattered points by an iterative process. In the first iteration, the point farthest from the mean is chosen as the first scattered point. In each subsequent iteration, a point from the cluster w is chosen that is farthest from the previously chosen scattered points. The points are then shrunk toward the mean by a fraction $\alpha$ (step 330).

The merge procedure begins by setting cluster w to the union of points within clusters u and v (step 302). In step 304, w.mean is calculated for the new cluster w. At step 306, parameters i (counter) and tmpSet (temporary set of data points) are initialized in preparation for the main loop (steps 308 to 326) of the merge procedure.

The main loop of the merge procedure starts at step 308 where the parameter maxDist (maximum distance from the set of scattered points) is initialized. A secondary loop (steps 310 to 322) begins at step 310 by selecting a point p from cluster w. Step 312 determines if this is the initial pass through the main loop (steps 308 to 326). If it is the initial pass through the main loop (i=1), the procedure continues at step 314 where minDist (minimum distance from the set of scattered points) is set to the distance between point p and the mean (w.mean) of cluster w. If it is not the initial pass through the main loop (i≠1), the procedure continues at step 316 where minDist is set to the minimum distance between point p and points q contained within the temporary set of data points tmpSet (the set of chosen scattered points).

Step 318 determines if the minDist is greater than the maxDist. If the minDist is greater than the maxDist, the procedure performs step 320 where maxDist is set to minDist and maxPoint (the point located the maximum distance away from the set of scattered points) is set to the current selected point p. At step 322, a determination is made as to whether there are any more points p within the merged cluster w. If there are more points p, the procedure returns to step 310 for another pass through the secondary loop.

Each subsequent pass through the secondary loop determines the point (maxPoint) that is furthest away from the points within tmpSet.

If there are no more points p within the cluster w, the procedure continues at step 324 where tmpSet is updated to include the prior contents of tmpSet and the new maxPoint. The main loop counter i is also incremented in preparation for the next pass through the main loop (steps 308 to 326). Step 326 determines if the loop counter i is less than or equal to the number c of well scattered points within the cluster w. Preferably, c will have a value greater than 10. If the counter i is less then or equal to the number c of well scattered points the procedure returns back to step 308 for another pass through the main loop.

If the counter i is greater then the number c of well scattered points the procedure continues at step 328 where a point p is selected from tmpSet (tmpSet comprises the set of scattered points obtained from cluster w). The point p is then shrunk toward the mean w.mean by a fraction $\alpha$ and then included in the representative points w.rep of cluster w in step 330 by setting w.rep to the union of $\{p+\alpha^* (w.mean-p)\}$. Preferably, $\alpha$ will have a value between 0.2 to 0.7. Step 332 determines if there are more points p within tmpSet. If there are more points p, the procedure continues back at step 328 where another point is selected and shrunk towards the w.mean. If there are no more points p within tmPset, the procedure is completed (step 340). At step 340, the procedure has created a set of representative points w.rep for the new cluster w that were initially selected as c well-scattered points, in which the point farthest from the mean is chosen as the first scattered point (while the remaining points chosen are the points furthest from the selected set of scattered points), and then shrunk toward the mean by a fraction $\alpha$ to form a set of points representative of the new cluster w.

In the merge procedure, the overhead of choosing representative points for the merged cluster w can be reduced as follows. As described above, the merge procedure chooses c scattered points from among all the points in the merged cluster w. Instead, if we selected the c scattered points for w from the 2c scattered points for the two clusters u and v being merged (the original scattered points for clusters u and v can be obtained by unshrinking their representative points by $\alpha$). Then, since at most 2c points instead of O(n) points need to be examined every time a scattered point is chosen, the complexity of the merge procedure reduces to O(1). Complexities are described below. Furthermore, since the scattered points for w are chosen from the original scattered points for clusters u and v, they can be expected to be fairly well spread out.

The time and space complexity of the clustering method of the present invention, for n input data points, is now examined. Time complexity will be expressed as an order of magnitude O( ). A time complexity of O($n^2$), for example, indicates that if the input size n doubles then the method requires four times as many steps to complete. Space complexity will also be expressed as an order of magnitude O( ). Therefore, a space complexity of O($n^2$), for example, indicates that if the input size n doubles then four times as much working storage will be required.

In the initialization phase, we build a heap Q and a tree T, each of which takes O(n log n) time. On the average, deleting and inserting an element from the heap takes O(log n) time. For the k-d tree, the average cost of inserting, as well as the expected nearest neighbor search time is O(log n).

Similarly, the average cost of deleting a randomly selected node from a randomly built k-d tree is O(log n). The body of the main loop of the clustering procedure (steps 204 to 240) is executed 0(n) times. In step 209, the cost of merging the two clusters and computing a new set of representative points for the merged cluster is 0(n) (since selecting c scattered points requires at most c passes over points in the merged cluster). Furthermore, in step 210, deleting and inserting the c representative points for the clusters u, v and w takes, on the average, 0(log n) steps.

Of the actions performed in the secondary loop of the clustering procedure (steps 214 to 242), the following two actions have the highest overhead and require 0(log n) steps—(1) probing the k-d tree to determine the closest cluster to x (in step 232), and (2) relocating a cluster in the heap (in steps 222 and 236).

The first is only executed for clusters x for which either u or v were the closest before they were merged. Assuming that a cluster can be the closest cluster to at most m clusters, step 232 is invoked in at most 2 m iterations of the secondary loop (steps 214 to 242).

The second, updating the heap Q to relocate x, on the other hand, may need to be performed in as many as 3 m iterations. The only clusters x for which x.closest can change are those for which either u or v were previously closest, or w becomes the new closest cluster. Then, for each iteration of the main loop (steps 204 to 240), we have 0(n) iterations of the secondary loop (steps 214 to 242), 0(m) of which have 0(log n) complexity for finding the closest cluster and relocating clusters in the heap. Therefore, the time complexity of our clustering method is $0(n^2+nm \log n)$. Since m can be n in worst case, the worst case complexity of our clustering method is $0(n^2 \log n)$.

H. S. M. Coxeter, in An Upper Bound for the Number of Equal Nonoverlapping Spheres that Can Touch Another of the Same Size, Symposia in Pure Mathematics, Volume 7, pages 53–71, 1964, indicates that m is 6 for 2 dimensions, 12 for 3 dimensions and is at most 244 for as many as 8 dimensions. These values are typically much smaller than n, and thus the time complexity of our clustering method is $0(n^2)$ when the dimensionality of data points is small. Although a time complexity of $0(n^2)$ is similar to the time complexities of prior art methods, the method of the present invention is more efficient since it achieves more accurate clusters while utilizing no more time than the prior art methods utilized. Since both the heap and the k-d tree require linear space (that is, in an order of magnitude of n), it follows that the space complexity of the method of the present invention is 0(n).

In a second embodiment of the present invention (step 104, a variation of step 112 that clusters all of the random data—since partial clusters are not used in this embodiment, and step 114 illustrated in FIG. 4 is performed), enhancements are made such that the clustering method can efficiently cluster very large databases. In order to handle large data sets, an effective mechanism for reducing the size of the input to the method of the present invention is required. One approach to achieving this is via random sampling of the input data set; the key idea is to apply the clustering method of the present invention to a random sample drawn from the data set rather than the entire data set. Typically, the random sample will fit in main-memory and will be much smaller than the original data set. Consequently, significant improvements in execution time can be realized. Also, random sampling can improve the quality of clustering since it has the desirable effect of filtering outliers.

FIG. 9 illustrates the process 198 of obtaining and using a random sampling of the input data set (step 104 illustrated in FIG. 4). In step 198a, the size $s_{min}$ of the random sample is calculated (the formula for this calculation is described in detail below). In step 198b, $S_{min}$ random points are selected from the data set S. These randomly selected points are then provided as the input data set to the clustering procedure described above (FIGS. 6a–7). Efficient methods of drawing a sample randomly from data in a file in one pass and using constant space are well known in the art. For example, Jeff Vitter, in Random Sampling with a Reservoir, ACM Transactions on Mathematical Software 11(1): 37–57, 1985, discloses a well known method of drawing a random sample which is hereby incorporated by reference. As a result the present invention employs one of these well-known methods for generating the random sample. In addition, the overhead of generating a random sample is very small compared to the time for performing clustering on the sample (random sampling typically takes less than two seconds to sample a few thousand points from a file containing hundred thousand or more points).

The present invention utilizes Chernoff bounds (described below) to analytically derive values for sample sizes s for which the probability of missing clusters is low. It is assumed that the probability of missing a cluster u is low if the sample contains at least f|u| points from the sample, where $0 \leq f \leq 1$. This is a reasonable assumption to make since clusters will usually be densely packed and a subset of the points in the cluster is all that is required for clustering. Furthermore, the value of f depends on the cluster density as well as the intercluster separation. That is, the more well-separated and the more dense clusters become, the smaller the fraction of the points from each cluster that we need for clustering.

The present invention uses Chernoff bounds to determine the sample size s for which the probability that the sample contains fewer than f|u| points belonging to cluster u is less than δ, where $0 \leq \delta \leq 1$. Let $X_j$ be a random variable that is 1 if the $j^{th}$ point in the sample belongs to cluster u and 0 otherwise. It can be assumed that all $X_1, X_2, \ldots X_s$ are independent 0–1 random variables. Note that $X_1, X_2, \ldots X_s$ are independent Bernoulli trials such that for $1 \leq j \leq s$, $$P(X_j = 1) = \frac{|u|}{N},$$

where N is the size of the entire data set. Thus, the number of data points in the sample belonging to cluster u is given by the random variable $$X = \sum_{j=1}^{s} Xj.$$

Also, the expected value of X, $$\mu = E[X] = E\left[\sum_{j=1}^{s} Xj\right] = \sum_{j=1}^{s} E[Xj] = \frac{s|u|}{N}.$$

Chernoff bounds state that for $0<\epsilon<1$, and independent Poisson trials $X_1, X_2 \ldots X_s$, $$P[X < (1-\varepsilon)\mu] < e^{\frac{-\mu\varepsilon^2}{2}} \quad (1)$$

Thus, due to Chernoff bounds, the expression on the right hand side is an upper bound on the probability that the number of u's points in the sample, X, falls below the expected count, $\mu$, by more than $\epsilon\mu$. For the clustering application of the present invention, it is desired that the probability of the number of u's points in the sample, X, falling below f|u| to be no more than $\delta$. Stated otherwise, (2) $P[X<f|u|]<\delta$.

Equations (1) and (2) can be solved to derive the following value for the minimum sample size s. For a cluster u, equation (2) holds if the sample size s satisfies $$s \geq fN + \frac{N}{|u|}\log\left(\frac{1}{\delta}\right) + \frac{N}{|u|}\sqrt{\left(\log\left(\frac{1}{\delta}\right)\right)^2 + 2f|u|\log\left(\frac{1}{\delta}\right)} \quad (3)$$

Thus, based on the above equation, it can be concluded that for the sample to contain at least f|u| points belonging to cluster u (with high probability), the sample must contain more than a fraction f of the total number of points. Also, suppose $u_{min}$ is the smallest cluster desired, and $s_{min}$ is the result of substituting $|u_{min}|$ for |u| in the right hand side of equation (3). It is easy to observe that equation (3) holds for $s=s_{min}$ and all $|u| \geq |u_{min}|$. Thus, with a sample of size $s_{min}$ it is guaranteed with a high probability, $1-\delta$, that the sample contains at least f|u| points from an arbitrary cluster u. Also, assuming that there are k clusters, with a sample size of $s_{min}$ the probability of selecting fewer than f|u| points from any one of the clusters u is bounded above by k.

Equation (3) seems to suggest that the sample size required increases linearly with the input size N. However, this is misleading since as N increases, so does $|u_{min}|$, while the fraction f of each cluster that we need for clustering decreases. Typically, there is no interest in clusters that are very small relative to the input size since these tend to be statistically insignificant and are considered to be outliers. Thus, it can be assumed that the smallest cluster is some percentage of the average cluster size; that is, $$|u_{min}| = \frac{N}{k\rho},$$

where $\rho > 1$. Furthermore, depending on the geometry of the smallest cluster, in order to represent it adequately in the sample, a constant number of points, $\epsilon$, is needed from it. Thus, $$f = \frac{\epsilon}{|u_{min}|}$$

and the sample contains $$\frac{\epsilon|u|}{|u_{min}|}$$

points from an arbitrary cluster u. From the above discussion, the following equation can be derived for the minimum sample size.

$$S_{min} = \epsilon k\rho + k\rho\log\left(\frac{1}{\delta}\right) + k\rho\sqrt{\left(\log\left(\frac{1}{\delta}\right)\right)^2 + 2\epsilon\log\left(\frac{1}{\delta}\right)} \quad (4)$$

This implies that if only clusters whose size is greater than $$\frac{N}{k\rho}$$

and require $\epsilon$ points from the smallest cluster is desired, then a sample which is independent of the original number of data points is required. Preferably, for a k=100, $\rho$=2, $\epsilon$=10 and $\delta$=0.001, a sample size of about 6000 is sufficient for clustering. This is independent of N, thus making the method of the present invention very scaleable.

Figure 8A:
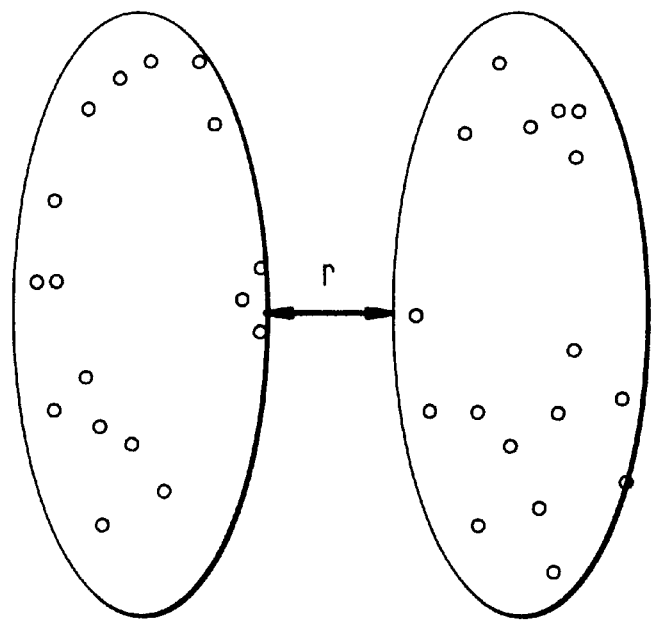
FIGS. 8a and 8b illustrate the decomposition of a cluster into subclusters in accordance with a preferred embodiment of the present invention.

If the distance between a pair of clusters is small, then having the sample contain a fraction f for each of them may not enable the clustering method of the present invention to distinguish them. The reason for this is that the sampled points for a cluster may not be uniformly distributed and as shown in FIG. 8a, points across clusters may end up becoming closer to one another than points within the cluster.

Figure 8B:
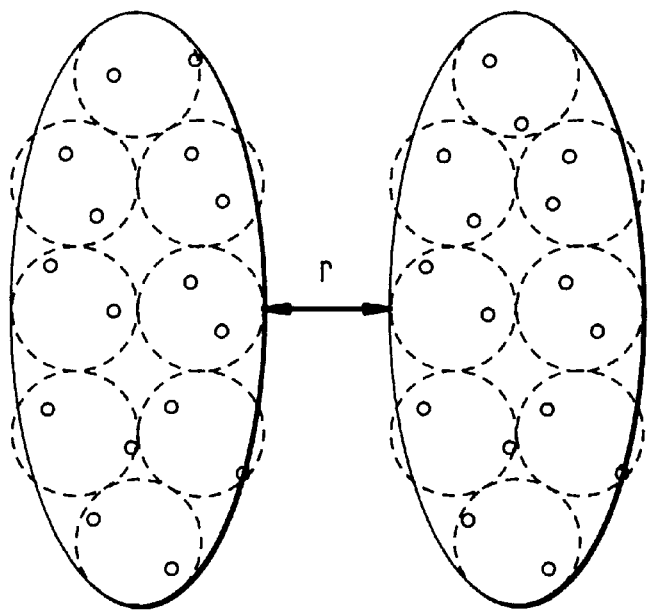

A solution for this problem is to consider each cluster as a collection of subclusters and then require the sample to contain a fraction f from each subcluster (see FIG. 8b). If r is the distance between the closest pair of clusters, then it is sufficient to view each cluster u in a granularity of distance r—that is, as a collection of subclusters of diameter r. The sample size can then be derived as described above in equation (4) for these larger number of subclusters.

Since the input to clustering method of the second embodiment of the present invention is a set of randomly sampled points from the original data set, the final k clusters involve only a subset of the entire set of points. FIG. 10 illustrates the process of providing a cluster label to the unused data points of the input data set S (step 114 illustrated in FIG. 4). This labeling process would occur after the clustering process (FIGS. 6a–7) completes (step 250) and will be designated as step 260.

In step 260a, an unused data point is retrieved from the data set S. The distance between the unused data point and a fraction of randomly selected representative points for each of the final k clusters is calculated in step 260b. Each data point is assigned to the cluster containing the representative point closest to it in step 260c. Step 260d determines if there are more unassigned data points (that is, a data point from the original data set S that has not been provided with a cluster label). If there are more unassigned data points, the labeling process continues at step 216a, otherwise the labeling process is completed. Approximating every cluster with multiple points enables the present invention, in the final phase, to correctly distribute the data points when clusters are non-spherical or non-uniform.

In a third embodiment of the present invention, enhancements are made such that the execution time of the clustering method can be greatly improved (steps 104 to 114 illustrated in FIG. 4). In this embodiment, a simple partitioning scheme is used for speeding up the method of the present invention when input sizes become large. Prior to the detailed description, a brief overview of the third embodiment will be provided.

Briefly, the basic idea is to partition the sample space into p partitions, each of size $$\frac{n}{p}$$

(step 106 illustrated in FIG. 4). The method then partially clusters each partition until the final number of clusters in each partition reduces to $$\frac{n}{pq}$$

for some constant q>1 (step 108 illustrated in FIG. 4). Alternatively, merging of clusters can be stopped in a partition if the distance between the closest pair of clusters to be merged next increases above a certain threshold. Once clusters are generated for each partition, a second clustering pass is performed on the $$\frac{n}{p}$$

partial clusters for all the partitions (that resulted from the first pass). Preferably, q=3 while p can range between 1 and 50.

The advantage of partitioning the input in the above mentioned fashion is that reduced execution times by a factor of approximately $$\frac{q-1}{pq} + \frac{1}{q^2}$$

can be achieved. The reason for this is that the complexity execution of clustering any one partition is $$O\left(\frac{n^2}{p^2}\left(\frac{q-1}{q}\right)\log\frac{n}{p}\right)$$

since the number of points per partition is $$\frac{n}{p}$$

and the number of merges that need to be performed for the number of clusters to reduce to $$\frac{n}{pq} \text{ is } \frac{n}{p}\left(\frac{q-1}{q}\right)$$

Since there are p such partitions, the complexity of the first pass becomes $$O\left(\frac{n^2}{p}\left(\frac{q-1}{q}\right)\log\frac{n}{p}\right).$$

The time complexity of clustering the $$\frac{n}{q}$$

clusters in the second pass is $$O\left(\frac{n^2}{q^2}\log\frac{n}{p}\right)$$

Thus, the complexity of the partitioning procedure of the present invention is $$O\left(\frac{n^2}{p}\left(\frac{q-1}{q}\right)\log\frac{n}{p} + \frac{n^2}{q^2}\log\frac{n}{p}\right)$$

which corresponds to an improvement factor of approximately $$\frac{q-1}{pq} + \frac{1}{q^2}$$

over clustering without partitioning.

An important point to note is that, in the first pass, the closest points in each partition are merged only until the final number of clusters reduces to $$\frac{n}{pq}$$

By ensuring that $$\frac{n}{pq}$$

is sufficiently large compared to the number of desired clusters, k, it can be ensured that even though each partition contains fewer points from each cluster, the closest points merged in each partition generally belong to the same cluster and do not span clusters. Thus, it can be ensured that partitioning does not adversely impact clustering quality. Consequently, the best values for p and q are those that maximize the improvement factor $$\frac{q-1}{pq} + \frac{1}{q^2}$$

while ensuring that $$\frac{n}{pq}$$

is at least 2 or 3 times k.

The partitioning scheme can also be employed to ensure that the input set to the clustering method of the present invention is always in main-memory even though the random sample itself may not fit in memory. If the partition size is chosen to be smaller than the main-memory size, then the input points for clustering during the first pass are always main-memory resident. By storing only the representative points for each cluster input to the second pass, the input size for the second clustering pass can be reduced and thus, ensuring that it fits in main-memory.

Since the input to clustering method of the third embodiment of the present invention is a set of randomly sampled points from the original data set, the final k clusters involve only a subset of the entire set of points. FIG. 10 illustrates the process of providing a cluster label to the unused data points of the input data set S (step 114 illustrated in FIG. 4). This labeling process would occur after the clustering process (FIGS. 6a–7) completes (step 250) and will be designated as step 260.

In step 260a, an unused data point is retrieved from the data set S. The distance between the unused data point and a fraction of randomly selected representative points for each of the final k clusters is calculated in step 260b. Each data point is assigned to the cluster containing the representative point closest to it in step 260c. Step 260d determines if there are more unassigned data points (that is, a data point from the original data set S that has not been provided with a cluster label). If there are more unassigned data points, the labeling process continues at step 216a, otherwise the labeling process is completed. By approximating every cluster with multiple points enables the present invention, in the final phase, to correctly distribute the data points when clusters are non-spherical or non-uniform.

Any data set almost always contains outliers. These do not belong to any of the clusters and are typically defined to be points of non agglomerative behavior. That is, the neighborhoods of outliers are generally sparse compared to points in clusters, and the distance of an outlier to the nearest cluster is comparatively higher than the distances among points in bonafide clusters themselves.

Every clustering method needs mechanisms to eliminate outliers. In the present invention, outliers are dealt with at multiple steps. First, random sampling filters out a majority of the outliers. Furthermore, the few outliers that actually make it into the random sample are distributed all over the sample space. Thus, random sampling further isolates outliers.

Outliers, due to their larger distances from other points, tend to merge with other points less and typically grow at a much slower rate than actual clusters. Thus, the number of points in a collection of outliers is typically much less than the number in a cluster. This leads to a scheme of outlier elimination that proceeds in two phases (step 110 illustrated in FIG. 4). In the first phase, the clusters which are growing very slowly are identified and eliminated as outliers. This is achieved by proceeding with the clustering for some time until the number of clusters decreases below a certain fraction of the initial number of clusters. At this time, clusters with very few points (e.g., 1 or 2) are classified as outliers. The choice of a value for the fraction of initial clusters at which outlier elimination gets triggered is important. A very high value for the fraction could result in a number of cluster points being incorrectly eliminated—on the other hand, with an extremely low value, outliers may get merged into proper clusters before the elimination can kick in. An appropriate value for the fraction, obviously, is dependent on the data set. Preferably, the value of the fraction will be around $$\frac{1}{3}.$$

The second phase occurs toward the end of the third embodiment of the present invention as described in detail below (FIG. 11). Usually, the last few steps of a clustering are the most important ones, because the granularity of the clusters is very high, and a single mistake could have grave consequences. Consequently, the second phase of outlier elimination is necessary for good clustering. Generally, outliers form very small clusters. As a result, identifying such small clusters and eliminating them when there are very few clusters remaining, typically in the order of k, eliminates unwanted outliers.

Referring to FIG. 11, the process 400 of the third embodiment (steps 104 to 114 illustrated in FIG. 4) is as follows. In step 402, the random sample size $S_{min}$ of the input data set S is calculated as described above. In step 404, $S_{min}$ number of random points are selected from the data set S (steps 402 and 404 comprising step 104 illustrated in FIG. 4). These randomly selected data points are partitioned into partitions of size $$\frac{n}{p}$$

in step 406 (step 106 illustrated in FIG. 4). In step 408, one partition of the random set of data points is provided as an input to the clustering procedure (FIGS. 6a–7) along with the desired number of clusters $$\frac{n}{pq}$$

to undergo partial clustering (step 108 illustrated in FIG. 4). Step 410 determines if there are more partitions to partially cluster. If there are more partitions to partially cluster, the procedure continues back at step 408, otherwise the procedure continues to step 412.

In step 412, a partially clustered partition is selected (in preparation of step 110 illustrated in FIG. 4). Step 414 determines if the partially clustered partition contains less than 3 points (that is, if it is a partial cluster containing outliers). If there are less than three points, the partial cluster is eliminated in step 416 and the procedure continues at step 418. If there are three or more points in the partial cluster, the procedure continues at step 418. Step 418 determines if there are more partially clustered partitions to undergo this "outlier elimination" procedure. If there are more partially clustered partitions to consider, the procedure continues back at step 412, otherwise the procedure continues at step 420.

In step 420, the data points within the remaining partially clustered partitions (also referred to as partial clusters) and the desired number of clusters k are provided to the clustering procedure (FIGS. 6a–7) to undergo the final clustering procedure (step 112 illustrated in FIG. 4). Although not shown, an additional outlier elimination procedure (as in steps 412 to 418) can be performed after step 420, if desired, to eliminate more outliers. At step 422, there are k desired clusters, but not all of the input data has been assigned to these clusters. Therefore, at step 422, an unused data point (unassigned) is selected from the original data set S (step 114 illustrated in FIG. 4). The distance between the unused data point and a fraction of randomly selected representative points for each of the final k clusters is calculated in step 424. Each data point is assigned to the cluster containing the representative point closest to it in step 426. Step 428 determines if there are more unused data points (that is, an unused data point from the original data set S that has not been provided with a cluster label). If there are more unused data points, the labeling process continues at step 422, otherwise the labeling process is completed.

The invention is preferably carried out with a general purpose computer which is programmed to carry out the operations discussed above. However, it should be understood that one or more of the operations described may also be carried out in an equivalent manner by a special purpose computer or hardware circuits. Thus, one or more portions of the invention may be performed with hardware, firmware, software or any combination of these.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A computer based method of clustering related data in a computer database, said computer database stored on a computer readable medium and including a set of data points, the method comprising the steps of:
   a) establishing a cluster for every data point in said computer database, said data points being representative points of said cluster;
   b) calculating a distance between said representative points of every cluster;
   c) merging a pair of clusters having a closest pair of representative points into a merged cluster, said merged cluster having representative points;
   d) calculating a mean of said representative points for said merged cluster;
   e) selecting a number of scattered data points from said representative points of said merged cluster, said scattered data points representing a shape of said merged cluster;
   f) establishing a new set of representative points for said merged cluster by shrinking said number of scattered points toward the mean of said merged cluster;
   g) repeating steps b) through f) until a predetermined termination condition is met; and
   h) storing clusters which remain after step g) in a computer readable medium.

2. The method of claim 1 wherein the step of calculating a distance between said representative points is performed by an Euclidean distance metric.

3. The method of claim 1 wherein the step of calculating a distance between said representative points is performed by a Manhattan distance metric.

4. The method of claim 1 wherein the step of selecting a number of scattered data points from said representative points of said merged cluster comprises the steps of:
   e1) selecting a point from said representative points of said merged cluster that is furthest away from the mean of said merged cluster to be a scattered data point;
   e2) selecting a point from said representative points of said merged cluster that is furthest away from previously selected scattered data points to be a scattered data point; and
   e3) repeating step e2) until a desired number of scattered data points is obtained.

5. The method of claim 1 wherein the shrinking of said number of scattered points is performed by multiplying said number of scattered points by a shrinking fraction.

6. The method of claim 5 wherein the shrinking fraction is selected from a range of 0.2 to 0.7.

7. The method of claim 1 wherein the predetermined termination condition is a obtaining a desired number of clusters.

8. The method of claim 1 wherein the number of scattered points selected is more than 10.

9. A computer based method of clustering related data in a large computer database, said large computer database stored on a computer readable medium and including a set of data points, the method comprising the steps of:
   a) selecting a random set of data points from said large computer database;
   b) establishing a cluster for said random set of data points, said random set of data points being representative points of said cluster;
   c) calculating a distance between said representative points of every cluster;
   d) merging a pair of clusters having a closest pair of representative points into a merged cluster, said merged cluster having representative points;
   e) calculating a mean of said representative points for said merged cluster;
   f) selecting a number of scattered points from said representative points of said merged cluster, said scattered data points representing an extent of said merged cluster;
   g) establishing a new set of representative points for said merged cluster by shrinking said number of scattered points toward the mean of said merged cluster;
   h) repeating steps c) through g) until a predetermined termination condition is met; and
   i) storing clusters which remain after step h) in a computer readable medium.

10. The method of claim 9 wherein said random set of data points has a size determined by Chernoff bounds.

11. The method of claim 9 further comprising the step of:
    j) assigning a cluster label to said data points not included in said random set of said data points.

12. The method of claim 9 wherein the step of calculating a distance between said representative points is performed by an Euclidean distance metric.

13. The method of claim 9 wherein the step of calculating a distance between said representative points is performed by a Manhattan distance metric.

14. The method of claim 9 wherein the step of selecting a number of scattered data points from said representative points of said merged cluster comprises the steps of:
    f1) selecting a point from said representative points of said merged cluster that is furthest away from the mean of said merged cluster to be a scattered data point;
    f2) selecting a point from said representative points of said merged cluster that is furthest away from previously selected scattered data points to be a scattered data point; and
    f3) repeating step f2) until a desired number of scattered data points is obtained.

15. The method of claim 9 wherein the shrinking of said number of scattered points is performed by multiplying said number of scattered points by a shrinking fraction.

16. The method of claim 15 wherein the shrinking fraction is selected from a range of 0.2 to 0.7.

17. The method of claim 9 wherein the predetermined termination condition is obtaining a desired number of clusters.

18. The method of claim 9 wherein the number of scattered points selected is more than 10.

19. A computer based method of clustering related data in a large computer database, said large computer database stored on a computer readable medium and including a set of data points, the method comprising the steps of:
    a) selecting a random set of data points from said large computer database;
    b) partitioning said random set of data points;
    c) clustering said partitioned random set of data points, said clustering comprising the steps of:
    d) establishing a partial cluster for said partitioned random set of data points, said partitioned random set of data points being representative points of said partial cluster;

e) calculating a distance between said representative points of every partial cluster;

f) merging a pair of partial clusters having a closest pair of representative points into a merged partial cluster, said merged partial cluster having representative points;

g) calculating a mean of said representative points for said merged partial cluster;

h) selecting a number of scattered data points from said merged partial cluster, said scattered data points representing a shape of said merged partial cluster;

i) establishing a new set of representative points for said merged partial cluster by shrinking said number of scattered points toward the mean of said merged partial cluster;

j) repeating steps e) through i) until a predetermined termination condition is met;

k) clustering said partial clusters, said clustering comprising the steps of:

l) establishing a cluster for said representative points of said partial clusters;

m) calculating a distance between representative points of every cluster;

n) merging a pair of clusters having a closest pair of representative points into a merged cluster, said merged cluster having representative points;

o) calculating a mean of said representative points for said merged cluster;

p) selecting a number of scattered data points from said merged cluster, said scattered data points representing a shape of said merged cluster;

q) establishing a new set of representative points for said merged cluster by shrinking said number of scattered points toward the mean of said merged cluster;

r) repeating steps m) through q) for said merged pair of clusters until a predetermined termination condition is met; and s) storing clusters which remain after step r) in a computer readable medium.

20. The method of claim 19 further comprising the step of:

t) assigning a cluster label to said data points not included in said random set of said data points.

21. The method of claim 19 wherein the steps of calculating a distance between said representative points is performed by an Euclidean distance metric.

22. The method of claim 19 wherein the steps of calculating a distance between said representative points is performed by a Manhattan distance metric.

23. The method of claim 19 wherein the step of selecting a number of scattered data points from said merged cluster comprises the steps of:

p1) selecting a point from said merged cluster that is furthest away from the mean of said merged cluster to be a scattered data point;

p2) selecting a point from said merged cluster that is furthest away from previously selected scattered data points to be a scattered data point; and p3) repeating step p2) until a desired number of scattered data points is obtained.

24. The method of claim 19 wherein the shrinking of said number of scattered points is performed by multiplying said number of scattered points by a shrinking fraction.

25. The method of claim 24 wherein the shrinking fraction is selected from a range of 0.2 to 0.7.

26. The method of claim 19 wherein the step of clustering said partitioned random set of data points is terminated when a final number of partial clusters equals a reduction constant.

27. The method of claim 26 wherein the reduction constant is 3.

28. The method of claim 19 wherein the step of clustering said partitioned random set of data points is terminated when a distance between a pair of partial clusters to be merged have increased above a predetermined threshold.

29. The method of claim 19 wherein said random set of data points is partitioned into 50 or less partitions.

30. The method of claim 19 wherein the step of clustering said partial clusters is terminated when a desired number of clusters are obtained.

31. The method of claim 19 wherein the number of scattered points selected is more than 10.

32. A computer based method of clustering related data in a large computer database while removing outliers from said data, said large computer database stored on a computer readable medium and including a set of data points, the method comprising the steps of:

a) selecting a random set of data points from said large computer database;

b) partitioning said random set of data points;

c) clustering said partitioned random set of data points, said clustering comprising the steps of:

d) establishing a partial cluster for said partitioned random set of data points, said partitioned random set of data points being representative points of said partial cluster;

e) calculating a distance between said representative points of every partial cluster;

f) merging a pair of partial clusters having a closest pair of representative points into a merged partial cluster, said merged partial cluster having representative points;

g) calculating a mean of said representative points for said merged partial cluster;

h) selecting a number of scattered data points from said merged partial cluster, said scattered data points representing an extent of said merged partial cluster;

i) establishing a new set of representative points for said merged partial cluster by shrinking said number of scattered points toward the mean of said merged partial cluster;

j) repeating steps e) through i) until a predetermined termination condition is met;

k) eliminating partial clusters comprised of outliers;

l) clustering said partial clusters, said clustering comprising the steps of:

m) establishing a cluster for said representative points of said partial clusters;

n) calculating a distance between representative points of every cluster;

o) merging a pair of clusters having a closest pair of representative points into a merged cluster, said merged cluster having representative points;

p) calculating a mean of said representative points for said merged cluster;

q) selecting a number of scattered data points from said merged cluster, said scattered data points representing an extent of said merged cluster;

r) establishing a new set of representative points for said merged cluster by shrinking said number of scattered points toward the mean of said merged cluster;

s) repeating steps n) through r) until a predetermined termination condition is met; and t) storing clusters which remain after step s) in a computer readable medium.

33. The method of claim 32 further comprising the step of:

u) assigning a cluster label to said data points not included in said random set of said data points.

34. The method of claim 32 wherein the steps of calculating a distance between said representative points is performed by an Euclidean distance metric.

35. The method of claim 32 wherein the steps of calculating a distance between said representative points is performed by a Manhattan distance metric.

36. The method of claim 32 wherein the step of selecting a number of scattered data points from said merged cluster comprises the steps of:

q1) selecting a point from said merged cluster that is furthest away from the mean of said merged cluster to be a scattered data point;

q2) selecting a point from said merged cluster that is furthest away from previously selected scattered data points to be a scattered data point; and q3) repeating step q2) until a desired number of scattered data points is obtained.

37. The method of claim 32 wherein the shrinking of said number of scattered points is performed by multiplying said number of scattered points by a shrinking fraction.

38. The method of claim 37 wherein the shrinking fraction is selected from a range of 0.2 to 0.7.

39. The method of claim 32 wherein the step of clustering said partitioned random set of data points is terminated when a final number of partial clusters equals a reduction constant.

40. The method of claim 39 wherein the reduction constant is 3.

41. The method of claim 32 wherein the step of clustering said partitioned random set of data points is terminated when a distance between a pair of partial clusters to be merged have increased above a predetermined threshold.

42. The method of claim 32 wherein said random set of data points is partitioned into 50 or less partitions.

43. The method of claim 32 wherein the step of eliminating partial clusters comprised of outliers is performed by eliminating partial clusters comprised of fewer than 3 representative points.

44. The method of claim 32 wherein the step of clustering said partial clusters is terminated when a desired number of clusters is obtained.

45. The method of claim 32 wherein the number of scattered points selected is more than 10.

46. A computer readable storage medium containing a computer readable code for operating a computer to perform a clustering method on a computer database, said clustering method comprises the steps of:

a) establishing a cluster for every data point in said computer database, said data points being representative points of said cluster;

b) calculating a distance between said representative points of every cluster;

c) merging a pair of clusters having a closest pair of representative points into a merged cluster, said merged cluster having representative points;

d) calculating a mean of said representative points for said merged cluster;

e) selecting a number of scattered data points from said representative points of said merged cluster, said scattered data points representing a shape of said merged cluster;

f) establishing a new set of representative points for said merged cluster by shrinking said number of scattered points toward the mean of said merged cluster;

g) repeating steps b) through f) until a predetermined termination condition is met; and h) storing clusters which remain after step g) in a computer readable medium.

47. The computer readable storage medium of claim 46, wherein the clustering method performs the step of calculating a distance between said representative points by an Euclidean distance metric.

48. The computer readable storage medium of claim 46, wherein the step of selecting a number of scattered data points from said representative points of said merged cluster of said clustering method comprises the steps of:

e1) selecting a point from said representative points of said merged cluster that is furthest away from the mean of said merged cluster to be a scattered data point;

e2) selecting a point from said representative points of said merged cluster that is furthest away from previously selected scattered data points to be a scattered data point; and e3) repeating step e2) until a desired number of scattered data points is obtained.

49. The computer readable storage medium of claim 46, wherein the clustering method performs the step of shrinking said number of scattered points by multiplying said number of scattered points by a shrinking fraction.

50. The computer readable storage medium of claim 49, wherein the shrinking fraction is selected from a range of 0.2 to 0.7.

51. A computer readable storage medium containing a computer readable code for operating a computer to perform a clustering method on a large computer database, said clustering method comprises the steps of:

a) selecting a random set of data points from said large computer database;

b) establishing a cluster for said random set of data points, said random set of data points being representative points of said cluster;

c) calculating a distance between said representative points of every cluster;

d) merging a pair of clusters having a closest pair of representative points into a merged cluster, said merged cluster having representative points;

e) calculating a mean of said representative points for said merged cluster;

f) selecting a number of scattered points from said representative points of said merged cluster, said scattered data points representing a shape of said merged cluster;

g) establishing a new set of representative points for said merged cluster by shrinking said number of scattered points toward the mean of said merged cluster;

h) repeating steps c) through g) until a predetermined termination condition is met; and i) storing clusters which remain after step h) in a computer readable medium.

52. The computer readable storage medium of claim 51, wherein the clustering method determines a size of said random set of data points by Chernoff bounds.

53. The computer readable storage medium of claim 51, wherein the clustering method further comprises the step of:

j) assigning a cluster label to said data points not included in said random set of said data points.

54. The computer readable storage medium of claim 51, wherein the step of selecting a number of scattered data points from said representative points of said merged cluster of said clustering method comprises the steps of:

f1) selecting a point from said representative points of said merged cluster that is furthest away from the mean of said merged cluster to be a scattered data point;

f2) selecting a point from said representative points of said merged cluster that is furthest away from previously selected scattered data points to be a scattered data point; and f3) repeating step f2) until a desired number of scattered data points is obtained.

55. The computer readable storage medium of claim 51, wherein the predetermined termination condition of the clustering method is obtaining a desired number of clusters.

56. A computer readable storage medium containing a computer readable code for operating a computer to perform a clustering method on a large computer database, said clustering method comprises the steps of:

a) selecting a random set of data points from said large computer database;

b) partitioning said random set of data points;

c) clustering said partitioned random set of data points, said clustering comprising the steps of:

d) establishing a partial cluster for said partitioned random set of data points, said partitioned random set of data points being representative points of said partial cluster;

e) calculating a distance between said representative points of every partial cluster;

f) merging a pair of partial clusters having a closest pair of representative points into a merged partial cluster, said merged partial cluster having representative points;

g) calculating a mean of said representative points for said merged partial cluster, said scattered data points representing a shape of said merged partial cluster;

h) selecting a number of scattered data points from said merged partial cluster;

i) establishing a new set of representative points for said merged partial cluster by shrinking said number of scattered points toward the mean of said merged partial cluster;

j) repeating steps e) through i) until a predetermined termination condition is met;

k) clustering said partial clusters, said clustering comprising the steps of:

l) establishing a cluster for said representative points of said partial clusters;

m) calculating a distance between representative points of every cluster;

n) merging a pair of clusters having a closest pair of representative points into a merged cluster, said merged cluster having representative points;

o) calculating a mean of said representative points for said merged cluster;

p) selecting a number of scattered data points from said merged cluster, said scattered data points representing a shape of said merged cluster;

q) establishing a new set of representative points for said merged cluster by shrinking said number of scattered points toward the mean of said merged cluster;

r) repeating steps m) through q) for said merged pair of clusters until a predetermined termination condition is met; and s) storing clusters which remain after step r) in a computer readable medium.

57. The computer readable storage medium of claim 56, wherein the clustering method further comprises the step of:

t) assigning a cluster label to said data points not included in said random set of said data points.

58. The computer readable storage medium of claim 56 wherein the step of selecting a number of scattered data points said merged cluster of said clustering method comprises the steps of:

p1) selecting a point from said merged cluster that is furthest away from the mean of said merged cluster to be a scattered data point;

p2) selecting a point from said merged cluster that is furthest away from previously selected scattered data points to be a scattered data point; and p3) repeating step p2) until a desired number of scattered data points is obtained.

59. A programmed computer database clustering system comprising:

means for selecting a random set of data points from a large computer database stored on a computer readable medium;

means for partitioning said random set of data points;

means for clustering said partitioned random set of data points, said clustering means comprising:

means for establishing a partial cluster for said partitioned random set of data points, said partitioned random set of data points being representative points of said partial cluster;

means for calculating a distance between said representative points of every partial cluster;

means for merging a pair of partial clusters having a closest pair of representative points into a merged partial cluster, said merged partial cluster having representative points;

means for calculating a mean of said representative points for said merged partial cluster;

means for selecting a number of scattered data points from said merged partial cluster, said scattered data points representing a shape of said merged partial cluster;

means for establishing a new set of representative points for said merged partial cluster by shrinking said number of scattered points toward the mean of said merged partial cluster;

means for eliminating partial clusters comprised of outliers;

means for clustering said partial clusters, said clustering means comprising:

means for establishing a cluster for said representative points of said partial clusters;

means for calculating a distance between representative points of every cluster;

means for merging a pair of clusters having a closest pair of representative points into a merged cluster, said merged cluster having representative points;

means for calculating a mean of said representative points for said merged cluster;

means for selecting a number of scattered data points from said merged cluster, said scattered data points representing a shape of said merged cluster;

means for establishing a new set of representative points for said merged cluster by shrinking said number of scattered points toward the mean of said merged cluster; and means for storing clusters which remain in a computer readable medium.

60. The programmed computer database system of claim 59, further comprising means for assigning a cluster label to said data points not included in said random set of said data points.

61. The programmed computer database system of claim 59, wherein the means for selecting a number of scattered data points from said merged cluster comprises:

means for selecting a point from said merged cluster that is furthest away from the mean of said merged cluster to be a scattered data point; and means for selecting a point from said merged cluster that is furthest away from previously selected scattered data points to be a scattered data point.

62. The programmed computer database system of claim 59, wherein the means for shrinking said number of scattered points is performed by multiplying said number of scattered points by a shrinking fraction.

63. The programmed computer database system of claim 62, wherein the shrinking fraction is selected from a range of 0.2 to 0.7.

64. A programmed computer database clustering system comprising:

means for establishing a cluster for every data point in a computer database stored on a computer readable medium, said data points being representative points of said clusters;

means for calculating a distance between said representative points of every partial cluster;

means for merging a pair of clusters having a closest pair of representative points into a merged cluster, said merged cluster having representative points;

means for calculating a mean of said representative points for said merged cluster;

means for selecting a number of scattered data points from said merged cluster, said scattered data points representing a shape of said merged cluster;

means for establishing a new set of representative points for said merged cluster by shrinking said number of scattered points toward the mean of said merged cluster; and means for storing clusters which remain in a computer readable medium.

65. The programmed computer database system of claim 64, wherein the means for selecting a number of scattered data points from said merged cluster comprises:

means for selecting a point from said merged cluster that is furthest away from the mean of said merged cluster to be a scattered data point; and means for selecting a point from said merged cluster that is furthest away from previously selected scattered data points to be a scattered data point.

66. The programmed computer database system of claim 64, wherein the means for shrinking said number of scattered points is performed by multiplying said number of scattered points by a shrinking fraction.

67. The programmed computer database system of claim 66, wherein the shrinking fraction is selected from a range of 0.2 to 0.7.

68. A programmed computer database clustering system comprising:

means for selecting a random set of data points from a large computer database stored on a computer readable medium;

means for establishing a cluster for said random set of data points, said random set of data points being representative points of said cluster;

means for calculating a distance between said representative points of every cluster;

means for merging a pair of clusters having a closest pair of representative points into a merged cluster, said merged cluster having representative points;

means for calculating a mean of said representative points for said merged cluster;

means for selecting a number of scattered data points from said merged cluster, said scattered data points representing a shape of said merged cluster;

means for establishing a new set of representative points for said merged cluster by shrinking said number of scattered points toward the mean of said merged cluster; and means for storing clusters which remain in a computer readable medium.

69. The programmed computer database system of claim 68, further comprising means for assigning a cluster label to said data points not included in said random set of said data points.

70. The programmed computer database system of claim 68, wherein the means for selecting a number of scattered data points from said merged cluster comprises:

means for selecting a point from said merged cluster that is furthest away from the mean of said merged cluster to be a scattered data point; and means for selecting a point from said merged cluster that is furthest away from previously selected scattered data points to be a scattered data point.

71. The programmed computer database system of claim 68, wherein the means for shrinking said number of scattered points is performed by multiplying said number of scattered points by a shrinking fraction.

72. The programmed computer database system of claim 71, wherein the shrinking fraction is selected from a range of 0.2 to 0.7.

73. A computer based method of clustering related data in a large computer database, said large computer database stored on a computer readable medium and including a set of data points, the method comprising the steps of:

a) selecting a random set of data points from said large computer database;

b) partitioning said random set of data points;

c) clustering said partitioned random set of data points, said clustering comprising the steps of:

d) establishing a partial cluster for said partitioned random set of data points, said partitioned random set of data points being representative points of said partial cluster;

e) calculating a distance between said representative points of every partial cluster;

f) merging a pair of partial clusters having a closest pair of representative points into a merged partial cluster, said merged partial cluster having representative points;

g) calculating a mean of said representative points for said merged partial cluster;

h) selecting a number of scattered data points from said merged partial cluster;

i) establishing a new set of representative points for said merged partial cluster by shrinking said number of scattered points toward the mean of said merged partial cluster;

j) repeating steps e) through i) until either a final number of partial clusters equals a reduction constant or a distance between a pair of partial clusters to be merged has increased above a predetermined threshold;

k) clustering said partial clusters, said clustering comprising the steps of:

l) establishing a cluster for said representative points of said partial clusters;

m) calculating a distance between representative points of every cluster;

n) merging a pair of clusters having a closest pair of representative points into a merged cluster, said merged cluster having representative points;

o) calculating a mean of said representative points for said merged cluster;

p) selecting a number of scattered data points from said merged cluster;

q) establishing a new set of representative points for said merged cluster by shrinking said number of scattered points toward the mean of said merged cluster;

r) repeating steps m) through q) for said merged pair of clusters until a predetermined termination condition is met; and s) storing clusters which remain after step r) in a computer readable medium.

74. A computer based method of clustering related data in a large computer database, said large computer database stored on a computer readable medium and including a set of data points, the method comprising the steps of:

a) selecting a random set of data points from said large computer database;

b) partitioning said random set of data points;

c) clustering said partitioned random set of data points, said clustering comprising the steps of:

d) establishing a partial cluster for said partitioned random set of data points, said partitioned random set of data points being representative points of said partial cluster;

e) calculating a distance between said representative points of every partial cluster;

f) merging a pair of partial clusters having a closest pair of representative points into a merged partial cluster, said merged partial cluster having representative points;

g) calculating a mean of said representative points for said merged partial cluster;

h) selecting a number of scattered data points from said merged partial cluster;

i) establishing a new set of representative points for said merged partial cluster by shrinking said number of scattered points toward the mean of said merged partial cluster;

j) repeating steps e) through i) until a predetermined termination condition is met;

k) clustering said partial clusters, said clustering comprising the steps of:

l) establishing a cluster for said representative points of said partial clusters;

m) calculating a distance between representative points of every cluster;

n) merging a pair of clusters having a closest pair of representative points into a merged cluster, said merged cluster having representative points;

o) calculating a mean of said representative points for said merged cluster;

p) selecting a number of scattered data points from said merged cluster;

q) establishing a new set of representative points for said merged cluster by shrinking said number of scattered points toward the mean of said merged cluster;

r) repeating steps m) through q) for said merged pair of clusters until a desired number of clusters is obtained; and s) storing clusters which remain after step r) in a computer readable medium.

75. A computer based method of clustering related data in a large computer database while removing outliers from said data, said large computer database stored on a computer readable medium and including a set of data points, the method comprising the steps of:

a) selecting a random set of data points from said large computer database;

b) partitioning said random set of data points;

c) clustering said partitioned random set of data points, said clustering comprising the steps of:

d) establishing a partial cluster for said partitioned random set of data points, said partitioned random set of data points being representative points of said partial cluster;

e) calculating a distance between said representative points of every partial cluster;

f) merging a pair of partial clusters having a closest pair of representative points into a merged partial cluster, said merged partial cluster having representative points;

g) calculating a mean of said representative points for said merged partial cluster;

h) selecting a number of scattered data points from said merged partial cluster;

i) establishing a new set of representative points for said merged partial cluster by shrinking said number of scattered points toward the mean of said merged partial cluster;

j) repeating steps e) through i) until either a final number of partial clusters equals a reduction constant or a distance between a pair of partial clusters to be merged has increased above a predetermined threshold;

k) eliminating partial clusters comprised of outliers;

l) clustering said partial clusters, said clustering comprising the steps of:

m) establishing a cluster for said representative points of said partial clusters;

n) calculating a distance between representative points of every cluster;

o) merging a pair of clusters having a closest pair of representative points into a merged cluster, said merged cluster having representative points;

p) calculating a mean of said representative points for said merged cluster;

q) selecting a number of scattered data points from said merged cluster;

r) establishing a new set of representative points for said merged cluster by shrinking said number of scattered points toward the mean of said merged cluster;

s) repeating steps n) through r) until a predetermined termination condition is met; and t) storing clusters which remain after step s) in a computer readable medium.

76. A computer based method of clustering related data in a computer database, said computer database stored on a computer readable medium and including a set of data points, the method comprising the steps of:

a) establishing a cluster for every data point in said computer database, said data points being representative points of said cluster;

b) calculating a distance between said representative points of every cluster;

c) merging a pair of clusters having a closest pair of representative points into a merged cluster, said merged cluster having representative points;

d) calculating a mean of said representative points for said merged cluster;

e) selecting a number of scattered data points from said representative points of said merged cluster;

f) establishing a new set of representative points for said merged cluster by shrinking said number of scattered points toward the mean of said merged cluster;

g) repeating steps b) through f) until a desired number of clusters is obtained;

and h) storing clusters which remain after step g) in a computer readable medium.

* * * * *